United States Patent
Dutta et al.

(10) Patent No.: US 7,261,751 B2
(45) Date of Patent: Aug. 28, 2007

(54) SYNTHESIS GAS PROCESS COMPRISING PARTIAL OXIDATION USING CONTROLLED AND OPTIMIZED TEMPERATURE PROFILE

(75) Inventors: Subhash Dutta, Stillwater, OK (US); Harold A. Wright, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 401 days.

(21) Appl. No.: 10/912,787

(22) Filed: Aug. 6, 2004

(65) Prior Publication Data

US 2006/0029539 A1 Feb. 9, 2006

(51) Int. Cl.
*C01B 3/32* (2006.01)

(52) U.S. Cl. ............... 48/198.1; 48/61; 48/76; 48/197 R; 48/198.5; 48/198.6; 48/198.7; 252/373; 423/650; 423/652; 423/648.1; 422/188; 422/194; 422/189; 422/190

(58) Field of Classification Search .... 48/198.1–198.7, 48/197 R, 61, 76; 252/373; 423/650, 652, 423/648.1; 422/188, 194, 189, 190
See application file for complete search history.

(56) References Cited

U.S. PATENT DOCUMENTS

| | | | |
|---|---|---|---|
| 4,620,940 A * | 11/1986 | Quang et al. | 252/373 |
| 5,080,577 A | 1/1992 | Bell et al. | |
| 5,510,056 A * | 4/1996 | Jacobs et al. | 252/373 |
| 5,733,514 A | 3/1998 | Boucot et al. | |
| 6,602,478 B2 | 8/2003 | Brundage | |
| 6,743,400 B2 * | 6/2004 | Ramachandran et al. | 422/137 |
| 2003/0066240 A1 | 4/2003 | Keller | |

FOREIGN PATENT DOCUMENTS

| | | |
|---|---|---|
| EP | 0 330 751 | 9/1989 |
| EP | 0 842 894 | 5/1998 |
| GB | 6739 | 0/1915 |
| GB | 655869 | 8/1951 |
| GB | 2 274 284 | 7/1994 |
| WO | WO 01/51412 | 7/2001 |

* cited by examiner

*Primary Examiner*—Glenn Caldarola
*Assistant Examiner*—Vinit H. Patel
(74) *Attorney, Agent, or Firm*—Conley Rose P.C.

(57) ABSTRACT

This invention relates to methods for reacting a hydrocarbon, molecular oxygen, and optionally water and/or carbon dioxide, to form synthesis gas. The preferred embodiments are characterized by delivering a substochiometric amount of oxygen to each of a multitude of reaction zones, which allows for optimum design of the catalytic packed bed and the gas distribution system, and for the optimization and control of the temperature profile of the reaction zones. The multitude of reaction zones may include a series of successive fixed beds, or a continuous zone housed within an internal structure having porous, or perforated, walls, through which an oxygen-containing stream can permeate. By controlling the oxygen supply, the temperatures, conversion, and product selectivity of the reaction can be in turn controlled and optimized. Furthermore the potential risks of explosion associated with mixing hydrocarbon and molecular oxygen is minimized with increased feed carbon-to-oxygen molar ratios.

34 Claims, 11 Drawing Sheets

SYNTHESIS GAS PROCESS COMPRISING PARTIAL OXIDATION USING CONTROLLED AND OPTIMIZED TEMPERATURE PROFILE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

The present invention relates generally to methods and apparatus for performing a catalytic partial oxidation process. More specifically, the present invention relates to methods and apparatus for a catalytic partial oxidation reactor using controlled and optimized temperature profile.

BACKGROUND OF THE INVENTION

Many refineries face an abundant supply of lower alkanes, i.e., C1-C5 alkanes such as methane, and relatively few means of converting them to more valuable products. Moreover, vast reserves of methane, the main component of natural gas, are available in many areas of the world, and natural gas is predicted to outlast oil reserves by a significant margin. Thus, there is great incentive to exploit these natural gas formations. However, most natural gas formations are situated in areas that are geographically remote from population and industrial centers. The costs of compression, transportation, and storage can make the use of these remote formations economically unattractive. In order to improve the economics of natural gas use, much research has focused on methane as a starting material for the production of higher hydrocarbons and hydrocarbon liquids, which are more easily transported than syngas.

The conversion of methane or natural gas to higher hydrocarbons is typically carried out in two steps. In the first step, methane or natural gas and an oxidant (water and/or molecular oxygen) are converted to a mixture of carbon monoxide and hydrogen (referred to as "synthesis gas" or "syngas"). In a second step, the synthesis gas is converted to higher hydrocarbons for example, by using the Fischer-Tropsch process or to methanol by using an alcohol synthesis process. Current industrial use of methane or natural gas as chemical feedstocks proceeds by the initial conversion of methane to carbon monoxide and hydrogen by either steam reforming, which is the most widespread process, or by dry ($CO_2$) reforming or by autothermal reforming (with combination of $O_2$ and steam). Other processes for making syngas include partial oxidation, catalytic partial oxidation, and advanced gas heated reforming.

Steam reforming is currently a major process used commercially for the conversion of methane to synthesis gas, proceeding according to Equation 1.

$$CH_4 + H_2O \leftrightarrow CO + 3H_2 \qquad (1)$$

Although steam reforming has been practiced for over five decades, efforts to improve the energy efficiency and reduce the capital investment required for this technology continue. For many industrial applications such as Fischer-Tropsch process and alcohol synthesis process, the 3:1 ratio of $H_2$:CO in the syngas product is problematic as being higher than the stoichiometric ratio necessary for the downstream conversion of the synthesis gas to fuels and/or to chemicals such as methanol, and the typically large steam reforming plants are not practical to set up at remote sites of natural gas formations.

The catalytic partial oxidation (CPOX) or direct partial oxidation of hydrocarbons (e.g., natural gas or methane) to synthesis gas has also been described in the literature. In catalytic partial oxidation, natural gas is mixed with air, oxygen-enriched air, or molecular oxygen and introduced to a catalyst at elevated temperature and pressure. The partial oxidation of methane yields a syngas mixture with a $H_2$:CO ratio of 2:1, as shown in Equation 2.

$$CH_4 + \tfrac{1}{2}O_2 \leftrightarrow CO + 2H_2 \qquad (2)$$

This $H_2$:CO ratio is more useful than the ratio from steam reforming for the downstream conversion of the syngas to chemicals such as methanol and to fuels. The CPOX reaction is exothermic, resulting in high reactor operating temperatures well above 1000° C. Furthermore, oxidation reactions are typically much faster than reforming reactions. Methane residence times in steam reforming are on the order of 0.5-1 second, whereas for heterogeneously catalyzed partial oxidation, the residence time is on the order of a few milliseconds. For the same production capacity, syngas facilities for the partial oxidation of methane can be far smaller, and less expensive, than facilities based on steam reforming. This allows the use of much smaller reactors for catalytic partial oxidation processes than is possible in a conventional steam reforming process.

The current interest in partial oxidation processes, particularly employing a CPOX reactor, has resulted in various improvements in the technologies associated with syngas production, including catalyst composition, catalyst structure, reactor structure, and operating parameters. One aspect that has not received as much attention is the technology associated with the injection of feed gases into the partial oxidation reactor.

Because contact times in catalytic partial oxidation reactors are very short and can be on the order of milliseconds, an often desired component of a commercial scale CPOX operation is an apparatus to premix a hydrocarbon-containing feed, such as methane or natural gas, with a molecular oxygen-containing feed at high temperature, pressure and gas throughput in order to enable the catalytic reaction to proceed at short contact times so that the chemistry occurs at the correct stoichiometry throughout the catalytic zone. It is necessary to feed the reactant gases into the reactor under conditions of elevated temperature and pressure, and at the same time, it is desirable to mix the feed gases as completely as possible, so as to maximize the efficiency of the catalytic reaction. The same feed conditions that are conducive to efficient operation of the partial oxidation process, however, are conducive to reactions that are less desirable, and possibly even hazardous, such as the ignition and combustion of the feedstock.

In addition, gas-phase reactions in a CPOX reactor are particularly undesirable because they can increase the occurrence of undesired combustion reactions (producing steam and carbon dioxide), damage the catalyst, and accelerate its deactivation. In fact, these gas-phase reactions tend to generate an excessive gas peak temperature in the initial portion of the catalytic bed, resulting in decreased product selectivity. For this reason, it is particularly desirable to avoid gas-phase reaction during the pre-reaction stage (before contact to catalyst) and pre-ignition of the reactant gases. The pre-ignition point can be defined as the lower explosiveness concentration limits of the constituents in a mixture of a hydrocarbon and an oxidant. The lower explosiveness limits in the context of the production of synthesis gas are discussed in U.S. Pat. No. 4,620,940, which is hereby incorporated by reference herein for all purposes.

Moreover, the heated mixtures comprising molecular oxygen (very potent oxidant) and light hydrocarbons (combustible fluid), at pressures of interest for synthesis gas production, are highly reactive. In fact, maintaining the oxidant to combustible ratio within the desired limits is a critical element for the efficient operation of a CPOX process. Thus, it is often preferred to utilize mixing techniques or reactor designs that increase the controllability of the process as well as avoid pre-ignition and pre-reaction of the gases.

One technique, disclosed in U.S. Pat. No. 6,267,912, used in mixing the reactants is to place the mixing nozzles very close to the reaction zone such that there is a very short time between the reactants being mixed and contacting the catalyst. This technique often involves placing the mixing apparatus in close proximity to the reactor, which may make maintenance of the mixing apparatus difficult and requires that the mixer be designed to withstand the extreme environment of a partial oxidation reactor.

Thus, there remains a need in the art for methods and apparatus to improve the control and operation of a catalytic partial oxidation process, and more particularly to improve the means for delivering an oxidant stream and a combustible fluid stream to feed a catalytic partial oxidation reactor. Therefore, the embodiments of the present invention are directed to methods and apparatus that seek to overcome these and other limitations of the prior art.

SUMMARY OF THE PREFERRED EMBODIMENTS

Accordingly, there are provided herein methods and apparatus for reacting a hydrocarbon, molecular oxygen, and optionally water to form synthesis gas. The preferred embodiments are characterized by a staged injection of oxygen into one or more reaction zones, which allows for optimum design of the catalytic packed bed, the gas distribution system, and the reactor temperature profile. The preferred reactors may include a reaction zone housed within an internal structure having porous, or perforated, walls, through which an oxygen-containing stream is allowed to flow. Both the stage injections and/or permeation through wall perforations allow the control of the amount of oxygen being fed into the reaction zone. By controlling the oxygen supply, the temperatures, conversion, and product selectivity of the reaction can be in turn controlled and optimized. Furthermore the potential risks of explosion associated with mixing hydrocarbon and molecular oxygen is minimized with increased feed carbon-to-oxygen molar ratios.

In one embodiment a process for the production of synthesis gas comprises providing a reactor system comprising a multitude of partial oxidation zones connected in series and a plurality of oxidant gas inlets. Each oxidant gas inlet is suitable to deliver an amount of an oxygen-containing gas to at least one partial oxidation zone. The reactor also comprises one hydrocarbon gas inlet located upstream of the multitude of partial oxidation zones, wherein the hydrocarbon gas inlet being suitable to deliver an amount of a hydrocarbon gas to one partial oxidation zone. The method further comprises feeding a hydrocarbon gas through the hydrocarbon gas inlet to one partial oxidation zone, wherein the hydrocarbon gas has a hydrocarbon gas inlet temperature less than 400° C. The method also comprises feeding an oxygen-containing gas through the plurality of oxidant gas inlets to the multitude of partial oxidation zones. In certain embodiments, the molar ratio of oxygen-to-carbon is between 0.1 and 0.5. The hydrocarbon gas and oxygen are converted in the multitude of partial oxidation zones to form a multitude of gas effluents comprising hydrogen and carbon monoxide. At least one effluent gas has a gas temperature that is at least 550° C. greater than the hydrocarbon gas inlet temperature while each gas effluent has a gas temperature less than a predetermined maximum gas temperature. The predetermined maximum gas temperature depends on the catalyst composition, its thermal stability and the gas composition within each of the partial oxidation zone, and could be as high as about 1600° C. or as low as about 1000° C. In some preferred embodiments, the predetermined maximum gas temperature for each gas effluent is equal to or less than 1500° C., preferably equal to or less than 1400° C.; more preferably equal to or less than 1300° C. In some embodiments, the predetermined maximum gas temperature for each gas effluent is equal to or less than 1100° C. Unconverted hydrocarbon gas from one gas effluent of one partial oxidation zone is fed to the partial oxidation zone immediate downstream of said partial oxidation zone.

In certain embodiments, the partial oxidation zones comprise catalysts comprising at least one metal from Groups 8, 9, and 10 of the Periodic Table, such as rhodium, iridium, ruthenium, samarium, and combinations thereof. When the catalyst comprises rhodium, the catalyst may further comprise a rare-earth metal or metal oxide. The rare-earth metal preferably comprises samarium, ytterbium, praseodymium, neodymium, lanthanum or any combination of two or more thereof. In various embodiments, the multiple partial oxidation zones are arranged in series where hydrocarbon gas is fed into one end of the series of zones and oxygen-containing gas is injected into regions between the zones. In other embodiments, the partial oxidation zones are contained in a porous wall. Hydrocarbon gas is injected directly into the partial oxidation zones while the porous wall regulates the flow of oxygen-containing gas into the zone.

The invention further encompasses an apparatus for the production of synthesis gas comprising a reactor shell; an upper plenum within said reactor shell; a lower plenum within said reactor shell; an oxygen chamber located inside said reactor shell between the upper plenum and the lower plenum; a multitude of partial oxidation zones enclosed within porous or perforated walls, each partial oxidation zone being surrounded by the oxygen chamber; one oxidant gas inlet on the reactor shell in fluid communication with the oxygen chamber, said oxidant gas inlet being suitable to feed an oxygen-containing gas to the oxygen chamber; one hydrocarbon gas inlet on the reactor shell located upstream of the multitude of partial oxidation zones in the reactor upper plenum, said hydrocarbon gas inlet being suitable to distribute an amount of a hydrocarbon gas to each of the partial oxidation zones; one reactor outlet on the reactor shell located downstream of the multitude of partial oxidation zones in the reactor lower plenum, said hydrocarbon gas outlet being suitable to pass a product stream which exits the reactor vessel. In preferred embodiments, the multitude of partial oxidation zones has a gas temperature less than 1,300° C. In some embodiments, the apparatus comprises a plurality of oxidant gas inlets and a plurality of oxygen chambers, wherein one oxidant gas inlet is in fluid communication with one oxygen chamber.

Thus, the present invention comprises a combination of features and advantages that enable it to substantially improve the mixing and the net partial oxidation reaction of light hydrocarbons and an oxidant, more particularly of natural gas or methane and a molecular oxygen-containing gas in a catalytic partial oxidation process. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

Figure 1:
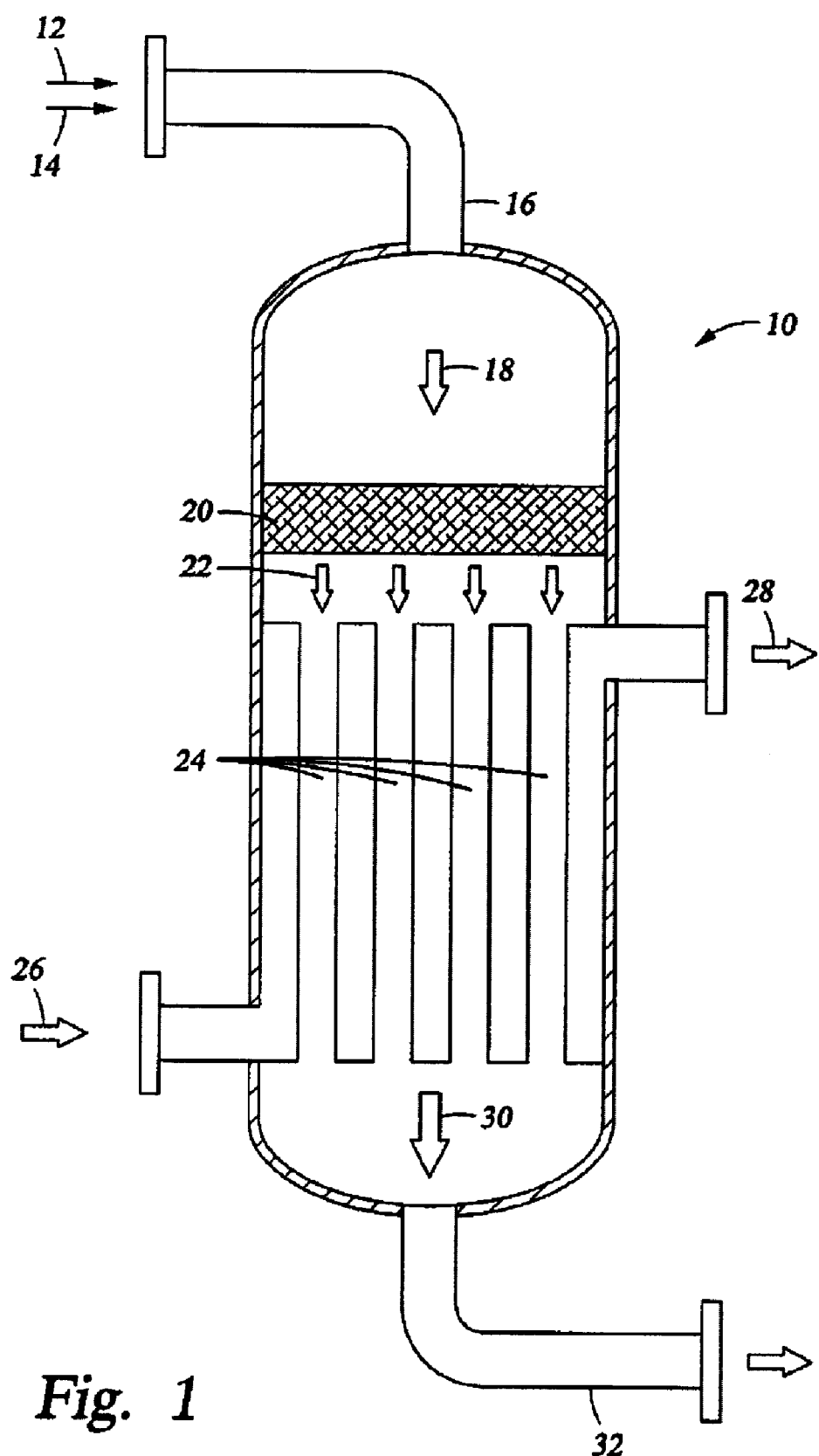
FIG. 1 is a schematic representation of a single fixed bed reactor.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

The preferred embodiments of the present invention relate to methods and apparatus for performing a catalytic partial oxidation reaction. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. Reaction conditions are selected to initiate an overall or net catalytic partial oxidation (CPOX) reaction, and to promote continuation of the process, which preferably is sustained autothermally. For the purposes of this disclosure, the term "net partial oxidation reaction" means that the partial oxidation reaction shown in Reaction 2, above, predominates. However, other reactions such as steam reforming (see Reaction 1), dry reforming (Reaction 3), and/or water-gas shift (Reaction 4) may also occur to a lesser extent.

$$CH_4+CO_2 \leftrightarrow 2CO+2H_2 \quad (3)$$

$$CO+H_2O \leftrightarrow CO_2+H_2 \quad (4)$$

The relative amounts of the CO and $H_2$ in the reaction product mixture resulting from the catalytic net partial oxidation of the methane or natural gas, and the molecular oxygen-containing feed mixture are close to the stoichiometric amounts (2:1) produced in the partial oxidation reaction of Reaction 2.

Combustion reactions and reforming reactions appear to occur simultaneously although with different predominances over the length of a catalytic partial oxidation packed bed reactor. Exothermic combustion reactions tend to predominate in the first millimeters of the catalyst bed thickness, whereas endothermic reforming reactions predominate in the downstream portion of the catalyst bed. Separation of predominantly combustion from predominantly reforming reactions could help in easier development and optimization of custom catalysts and in improved design of a more controllable and efficient catalytic partial oxidation process. Achieving apparently opposing objectives of fast combustion, low gas peak temperature and high reforming reaction rates may be very difficult with a single catalyst formulation and/or a single catalyst bed. According to the combined reaction mechanism (or pathway) determined for the net CPOX reaction, temperature rise may need to be controlled to achieve total consumption of molecular oxygen during a first stage (predominantly combustion zone) with minimum consumption of hydrocarbon gas (comprising methane or natural gas). The gas temperature, at any location during this stage, should not be allowed to rise above a certain maximum level to avoid both a) loss of product selectivity and b) loss of catalyst activity and life. A sustained and elevated gas temperature however is preferred for the second stage to carry out the predominantly reforming reactions to near-completion. A sustained and elevated gas temperature level may be very difficult to achieve by the single bed due to sharp temperature drop caused by the endothermic reforming reactions after the gas peak temperature is reached. Using multiple catalytic beds and maintaining an optimum peak temperature in each of the catalytic beds is a primary objective of the present invention.

Therefore various embodiments of the present invention provide a number of different methods and apparatus for performing a catalytic partial oxidation process. Reference is made to using a hydrocarbon gas and an oxidant or oxygen-containing stream to supply a catalytic partial oxidation reaction, but the use of the concepts of the present invention is not limited to use solely with a catalytic partial oxidation process, and can be used in any other appropriate process. It is to be fully recognized that the different teachings of the embodiments discussed below may be employed separately or in any suitable combination to produce desired results.

The hydrocarbon gas stream, the oxygen-containing stream, and any mixtures thereof, referred to in the current context need not be pure. Carbon dioxide and/or water may be present in one of these reactant gas streams or mixtures thereof, in relatively large amounts. Other components, such as hydrogen, nitrogen, argon, nitrogen containing compounds, sulfur containing compounds, or organic oxygenates, may be present in the hydrocarbon gas stream, the oxygen-containing stream, and any mixtures thereof. Typical hydrocarbon feeds used in the partial oxidation reaction include methane, natural gas, and/or other mixtures of light hydrocarbons, but it could also comprise water or steam, CO and $CO_2$. In order to simplify the following discussion, the hydrocarbon gas used is assumed to comprise at least one material from the group consisting of methane, natural gas, any gaseous hydrocarbon, and any mixtures thereof, and the oxygen-containing feed may comprise air, substantially pure molecular oxygen, oxygen-enriched air, or molecular oxygen with a diluent gas, and may in addition contain water or steam. In preferred embodiments, the oxygen-containing feed preferably comprises mainly molecular oxygen, and optionally water or steam. It is understood that those skilled in the art would recognize that the embodiments of the present invention could be used with a variety of different reactant mixtures in order to achieve the desired results.

Catalyst compositions used in the catalytic partial oxidation reaction are also known in the art. These compositions commonly comprise an active component selected from the metals of Groups 8, 9 and 10 of the Periodic Table of Elements (according to the New Notation IUPAC Form as illustrated in, for example, the *CRC Handbook of Chemistry and Physics*, $82^{nd}$ *Edition*, 2001-2002; said reference being the standard herein and throughout), such as nickel, ruthenium, rhodium, palladium, osmium, iridium, platinum, or combinations of two or more thereof. The active metal is supported on a support, often comprising the refractory oxides, such as silica, alumina, titania, zirconia, or mixtures of two or more thereof. The catalyst may further include another metal other than nickel, ruthenium, rhodium, palladium, osmium, iridium, and platinum. When the catalyst comprises rhodium, the catalyst preferably further comprises a rare-earth metal or a rare-earth metal oxide. The rare-earth metal preferably comprises samarium, ytterbium, praseodymium, neodymium, lanthanum, or any combination of two or more thereof. The techniques and arrangements for depositing the active metal on the support are known in the art. The completed catalyst may be formed as a fixed bed of particles or in a monolithic structure, such as a ceramic foam. The particles could have different shapes such as granules, beads, pills, pellets, cylinders, trilobes, extrudates, spheres or other rounded shapes, or other manufactured configuration. Preferably at least a majority (i.e., >50%) of the particles have a maximum characteristic length (i.e., longest dimension) of less than six millimeters, preferably less than three millimeters. According to some embodiments, the particles have a diameter or longest characteristic dimension of about 0.25 mm to 6.35 mm (about 1/100" to 1/4"). In preferred embodiments, the particle sizes are in the range of about 0.5-mm to about 4 mm. Suitable examples of catalysts and reaction conditions for the catalytic partial oxidation of a hydrocarbon gas are disclosed in U.S. Patent Publication No. 20020115730 to Allison et al.; in U.S. Pat. Nos. 6,402,989; 6,409,940; 6,461,539; 6,630,078; and 6,635,191; each of which is incorporated herein by reference in its entirety.

In the current context, porous, perforated, and permeable should be understood to refer to otherwise solid structures that are permeable to gas. A permeable structure is understood to describe a structure that has pores, holes, perforations, or openings allowing liquids or gases to pass through. A porous structure is understood to be a structure characterized as having a large number of very small openings, or pores, through which gas can flow. A perforated structure is understood to be a structure characterized by a smaller number of larger diameter, distinct holes, or perforations, as compared to a porous structure. Various geometries for the structure are contemplated, such as, but not limited to, cylindrical, conical, rod, cone, tubular, with cross-sectional areas that could be circular, semi-circular, ovoid, square, triangular, trilobe, hexagonal, any regular-shaped form with more than three sides, any irregular-shaped form, or combinations thereof. The structure preferably comprises a material, which is permeable to gas. In addition, the material in the structure is thermally stable, i.e., can sustain the high temperature, and pressure within the catalyst beds that are surrounded by the structure. Examples of suitable non-limiting materials are porous metals or metal alloys, porous ceramics and porous refractory metal oxides, such as a porous alumina, porous modified or stabilized alumina, porous titania, porous carbon, porous stainless steel, and the like.

FIG. 1 is a schematic representation of a conventional catalytic partial oxidation reactor 10 with a single fixed catalytic bed. A hydrocarbon gas 12 is mixed with an oxygen-containing stream 14 comprising molecular oxygen to form reactant gas stream 18, which is injected, through inlet 16. The net partial oxidation reaction conditions are promoted by optimizing the concentrations of hydrocarbon gas and molecular oxygen ($O_2$) in the reactant gas stream 18, preferably with a molar carbon:$O_2$ ratio (C:$O_2$) in the range of from about 1.5:1 C:$O_2$ to about 3.3:1 C:$O_2$, more preferably from about 1.6:1 C:$O_2$ to about 2.5:1 C:$O_2$.

In some embodiments, steam and/or carbon dioxide ($CO_2$) may also be present in the reactant gas stream 18 to produce extra hydrogen or CO via the steam and/or dry reforming reaction and to control (i.e., reduce) the exit temperature. The steam and/or $CO_2$ can be premixed with one of the feed gases (12 or 14) upstream of inlet 16, and/or can be premixed with the reactant gas stream 18, or may be added separately as an additional flow stream to inlet 16, as desired. It is preferred that the weight ratio of steam to carbon range of the feed initially in contact with the catalyst bed 20 is from 0 to about 3 and that the weight ratio of $CO_2$ to carbon range of the feed initially in contact with the catalyst bed 20 is from 0 to about 2. The reactant gas stream 18 is preferably preheated at a temperature between about 100° C. and 900° C., more preferably between about 100° C. and about 500° C., most preferably between about 300° C. and about 500° C.

The reactant gas stream 18 contacts catalyst bed 20 and starts undergoing the exothermic net partial oxidation reaction, which results in the temperature of gas stream to increase rapidly and reach a gas peak temperature varying from above 1500° C. to about 2000° C. or more. The gas peak temperature is typically reached within a few millimeters from the top of the catalytic bed 20, which first encounters the reactant gas. The gas peak temperature is largely dependent on various operating parameters such as the reactant gas stream pressure, the C:$O_2$ ratio of reactant gas stream 18, the heat loss from catalytic bed 20, catalyst composition in catalytic bed 20, and/or the temperature of the reactant gas stream 18. In particular, under similar conditions, the gas peak temperature tends to increase when the C:$O_2$ ratio of reactant gas stream 18 decreases, or when the catalyst bed 20 is approaching an adiabatic operation (i.e., substantially no heat loss). Uncontrolled high peak temperature may cause selectivity losses and catalyst damage.

As the reactant gas stream 18 continues to pass through catalyst bed 20 and as gaseous reactants get converted to gaseous products, the temperature of the gas stream flowing through the catalytic bed decreases from the peak temperature in an asymptotic manner due to some predominant steam and/or $CO_2$ reforming reactions, in such a manner that the temperature of products stream 22 exiting the catalyst bed 20 (exit temperature) is typically between about 700° C. and about 1300° C., preferably between about 700° C. and about 1100° C. As the reactants pass through bed 20, 100% of the oxygen is consumed. Products stream 22 exits catalyst bed 20 and flows through exchanger 24 contained in reactor 10 to obtain a cooled products stream 30. The exchanger 24 carries a cooling medium, typically water, or steam, which flows from inlet 26 to outlet 28. Products stream 30 then exits reactor 10 through outlet 32.

The biggest advantages of a single fixed bed catalytic partial oxidation reactor shown in FIG. 1 are its compact design and need for no additional heat supply. However, the single fixed bed reactor provides very little control over its performance and operation. Another drawback of the design of FIG. 1 is that the high gas peak temperature within the single catalytic zone is thought to contribute to catalyst deactivation and should preferably be maintained below 1500° C. in order to improve catalyst life and stability. Unfortunately, limiting the peak temperature within the catalytic zone is not possible with this single fixed bed reactor design without encountering other undesirable consequences. These factors are among the key disadvantages of the single fixed bed reactor and provide areas of potential improvement for alternative reactor designs.

Thus, the embodiments of the present invention seek to provide representative reactor designs, as well as methods of operating the reactor, that seek to improve upon the flexibility, catalyst stability, product selectivity, and safety of a catalytic partial oxidation reactor. The preferred embodiments employ a staged catalytic partial oxidation process that seeks to optimize at least one of the design elements of the catalytic packed, or fixed, bed, the gas distribution system, the gas injector system, and the interstage temperature profile within the reactor. In the preferred embodiments, the peak temperature is reduced by increasing the inlet combustible:$O_2$ ratio of the reactant gas stream. A combustible is a compound or a mixture of compounds which is capable of reacting with $O_2$ under suitable conversion conditions. Examples of combustible are hydrocarbons, carbon monoxide, hydrogen, or any mixture thereof.

In some embodiments, the reactor comprises a system of multiple packed beds with inter-bed oxygen injection, where the total oxygen need of the system is divided and injected in stages instead of a single injection of oxygen. The peak temperature in each packed bed is controlled primarily by the amount of oxygen injected to that bed such that the oxygen gets substantially consumed in each stage. The exit temperature from each bed, and particularly from the final bed, can be optimized to achieve near-complete hydrocarbon conversion, along with high CO and $H_2$ selectivities.

Figure 2:
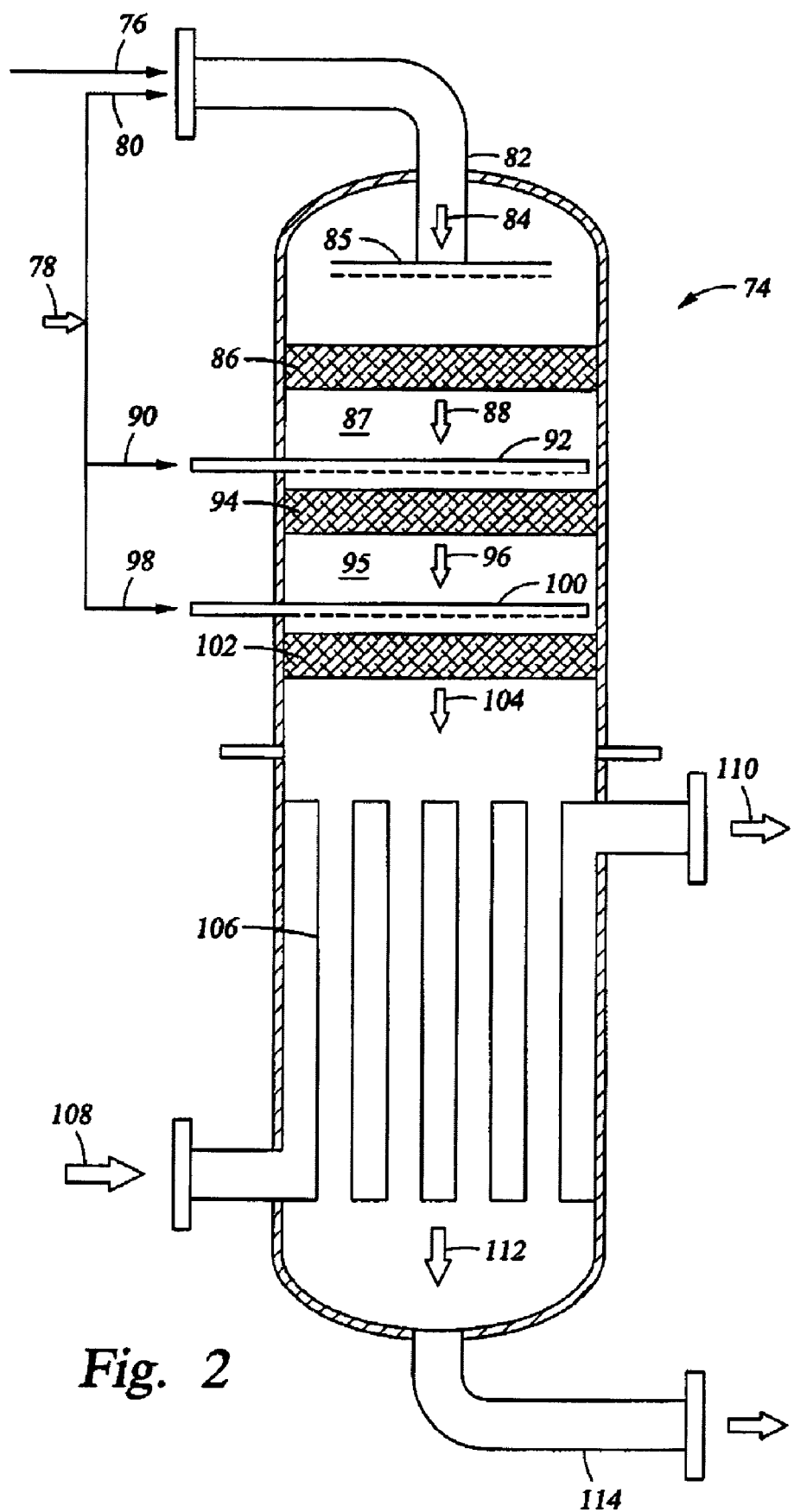
FIG. 2 is a schematic representation of one embodiment of a staged injection reactor with multiple fixed beds.

Referring now to FIG. 2, a first alternative of a catalytic partial oxidation reactor 74 using staged oxygen injection is shown. In reactor 74, a hydrocarbon gas 76 is injected in the conventional manner while an oxygen-containing stream 78 is injected into reactor 74 in stages to control the peak temperature within each of the catalytic beds comprising the reactor. The hydrocarbon gas 76 is mixed with a first oxygen-containing stream 80, which preferably includes approximately between about 20% and about 90%, preferably between about 20% and about 75%, yet more preferably between about 30% and about 60% of the oxygen requirements for the reaction, giving a carbon-to-oxygen atomic ratio (C/O) in the first stage reactant feed greater than about 1:1. When the oxygen in the oxygen-containing stream 78 comprises mainly molecular oxygen, the carbon-to-molecular oxygen molar ratio (C/$O_2$) in the first stage reactant feed should be greater than about 2.0:1, preferably greater than about 2.4:1, more preferably between 2.5:1 and 10:1, most preferably between about 3:1 and about 9:1. In preferred embodiments, hydrocarbon gas 76 is preferably injected through inlet 82 at a hydrocarbon gas inlet temperature less than about 550° C.; more preferably less than 400° C.; still more preferably between 100° C. and 400° C. In alternate embodiments, the initial reactant stream 84 (comprising the hydrocarbon gas 76 and the first oxygen-containing stream 80) is injected through inlet 82 at a temperature between about 100° C. and 900° C.; more preferably between about 100° C. and about 550° C.; still more preferably between about 300° C. and about 500° C.; yet still more preferably between about 300° C. and about 400° C.

The initial reactant gas stream 84 can be optionally distributed via distributor 85 and contacts a first catalyst bed 86 and combusts, creating a peak temperature of less than a maximum allowed peak temperature and producing first intermediate effluent gas or product stream 88. The maximum allowed peak temperature depends largely on the catalyst composition, the catalyst thermal stability, and the feed composition, so it could vary depending on their selection Typically, the maximum allowed temperature could be as high as 1800° C. or as low as 900° C., but is preferably equal to or less than 1600° C.; more preferably equal to or less than 1500° C. The optional distributor 85 may also be capable of distributing hydrocarbon gas 76 or oxygen-containing stream 80 individually. As the reactant gas stream 84 passes through partial oxidation zone or catalyst bed 86, the temperature of the gas stream falls to a temperature between about 800° C. and about 1000° C. and 100% of the oxygen is consumed. Typically, only about 30 to 70% of the hydrocarbon gas is consumed, but the percentage of consumed hydrocarbon gas may be lower than 30% (such as about 10-30%) and greater than 70% (such as about 70-90%) depending on the C:$O_2$ ratio of the feed. The reaction typically results in a selectivity for carbon monoxide and for hydrogen greater than about 85%, preferably greater than about 90%. Product stream 88 preferably has an $O_2$ content equal to or less than 1,000 ppm, more preferably less than 500 PPM; still more preferably less than 300 PPM.

Thus, as products stream 88 exits first catalyst bed 86, it enters into interbed region 87 and contains essentially no oxygen. A second oxygen-containing stream 90, which has between about 5% and about 80%, preferably between about 12% and about 80%, yet more preferably between about 20% and about 70% of the total oxygen requirements for the reactor, is injected into interbed region of reactor 74 by distributor 92. Distributor 92 may comprise inert packing, nozzles, sparging rings, or other gas distribution equipment and may also be capable of distributing product stream 88. The reactant gases, now at a temperature which is lower (preferably 10-80° C. lower) than the exit temperature of the gas leaving the first stage which is typically between about 800° C. and about 1000° C., enter the second catalyst bed 94 and ignite, reaching a peak temperature of less than 1500° C.

As the reactant gases pass through catalyst bed 94, the temperature of the stream falls to a temperature between about 900° C. and about 1000° C. and 100% of the oxygen is consumed. After the first and second stages, about 70-90% of the hydrocarbon gas has been consumed and the reaction results in a selectivity greater than 93% for carbon monoxide and for hydrogen. Second intermediate products stream 96 contains essentially no oxygen (i.e., less than 1,000 PPM $O_2$, preferably less than 500 PPM $O_2$, more preferably less than 300 PPM; still more preferably less than 200 PPM) when it exits second catalyst bed 94 and enters interbed region 95. A third oxygen-containing stream 98, which has between about 5% and about 75%, preferably between about 12% and about 68%, yet more preferably between about 20% and about 35% of the total oxygen requirements for the reactor, is injected into interbed region 95 of reactor 74 by distributor 100. Distributor 100 may comprise inert packing, nozzles, sparging rings, or other gas distribution equipment and may also be capable of distributing products stream 96. The reactant gases, now at a temperature which is lower (preferably 10-80° C. lower) than the exit temperature of the gas leaving the second stage which is typically between about 900° C. and about 1000° C., enter the third catalyst bed 102 and ignite, reaching a peak temperature of less than 1500° C.

As the reactant gases pass through third catalyst bed 102, the temperature of the stream falls to a temperature between about 950° C. and about 1100° C. and 100% of the oxygen is consumed. During this reaction about 97.8% of the methane is consumed and the reaction results in a CO selectivity greater than 93.5%, more typically greater than 96%, and a $H_2$ selectivity between about 92% and about 94%. Products stream 104 is then passed through exchanger 106, through which a coolant such as water or steam is fed between inlet 108 and outlet 110. Exchanger 106 is used to adjust the temperature of products stream 104 to the desirable levels before products 112 are removed from reactor 74 through outlet 114. Products stream 104 should have an $O_2$ content equal to or less than 1,000 PPM, preferably less than 500 PPM; more preferably less than 300 PPM; still more preferably less than 200 PPM.

Thus, reactor 74 of FIG. 2 provides a system with multiple packed beds and inter-bed oxygen injection. In contrast to the single injection of oxygen in single-bed CPOX reactors, the total oxygen need of the system is divided and injected in stages, such that the available oxygen gets completely consumed in each stage. The peak temperature in each packed bed is controlled primarily by the amount of oxygen injected to that bed. More specifically, the gas effluent temperature in a partial oxidation zone or guard bed may be controlled by performing the following steps: 1) measuring the gas effluent temperature; 2) comparing the measured gas effluent temperature to a desirable gas effluent temperature setpoint equal to, or lower than, 1300° C.; and 3) adjusting the $O_2$ mass flow of the oxygen-containing gas to the oxidant gas inlet feeding the partial oxidation zone so that the amount of oxygen delivered is suitable to obtaining a gas effluent temperature approaching or equal to the desirable setpoint. Adjusting the $O_2$ mass flow in order to reach the desired setpoint of the gas effluent temperature can be done by adjusting the flow rate of the oxygen-containing gas or the 02 content of the oxygen-containing gas or the pressure of the oxygen-containing gas or any combination thereof. For example, if the measured gas effluent temperature is lower than the desirable gas effluent temperature setpoint, the amount of $O_2$ fed to the partial oxidation zone may be increased by increasing the $O_2$ content, or by increasing the pressure of the oxygen-containing gas, or both. Conversely, if the measured gas effluent temperature is higher than the desirable gas effluent temperature setpoint, the amount of $O_2$ fed to the partial oxidation zone may be decreased by decreasing the $O_2$ content, or by decreasing the flow rate of the oxygen-containing gas, or both. The exit temperature from each bed and particularly from the final bed is optimized to achieve maximum reforming reaction rate possible to reach near-complete hydrocarbon conversion along with high carbon monoxide and hydrogen selectivities. One of the biggest advantages of the embodiment of FIG. 2 is that it does not require added heat.

In its general configuration, a preferred reactor contains multiple catalyst layers, or beds, arranged in series. Although a series of 2 beds has been shown to be quite effective in the net partial oxidation of gaseous hydrocarbons with molecular oxygen, it is envisioned at this point that three or more oxygen injections with 3 or more catalyst beds in series are preferred in order to achieve hydrocarbon conversion greater than 90%. A 2-stage injection process tends to favor product selectivities rather than hydrocarbon conversion. Depending on the particular design, these multiple beds may be proceeded by, or separated from adjacent beds by, an inert packing. Hydrocarbon gas, comprising methane or natural gas, is introduced upstream of the first packing.

A gas stream containing a varying composition of molecular oxygen, and optionally water or carbon monoxide is introduced upstream of each individual catalyst bed layer. In some embodiments, the oxygen containing stream is introduced within the inert packing, such as through a distributor. In some embodiments, the distributor may be a pipe having a specified number of gas injection points per unit bed cross section. In some embodiments, it is envisioned that the oxygen-containing streams could comprise one or more additional oxidants and that one additional oxidant might be present in at least one or more stages or all stages. For example, water or steam and/or $CO_2$ (as the additional oxidant) can be premixed with the hydrocarbon gas only upstream of the first stage, whereas molecular oxygen is injected throughout all the stages. Alternatively, water or steam and/or $CO_2$ (as the additional oxidant) can be added upstream of the last stage.

The number of injection points, the packing particle size, and the upstream location of the injection points relative to the surface of the next catalyst bed layer are determined to assure adequate mixing of the feed gases with the gases exiting the preceding catalyst bed layer. The temperature and composition of the mixed gas stream at each level of injection of the oxygen containing gas is maintained at a level sufficient to ignite the gases upon reaching the catalyst bed surface, but not to exceed a predetermined maximum gas temperature of about 1500° C., preferably less than about 1400° C., more preferably less than about 1300° C., within the catalyst bed layer. The optimum composition of the oxygen containing gas and temperature at the beginning of each stage can be determined through rigorous modeling and experimental validations.

The mixing of a hydrocarbon gas with molecular oxygen prior to entering the catalyst bed is a primary step in conventional catalytic partial oxidation reactors. The alternative embodiment discussed above involves mixing the hydrocarbon gas and oxygen at ratios chosen to avoid the explosive or flammable limits of the mixture and control the peak temperature below a maximum value in the reactor. Thus, the potential risk of explosion of this gas mixture is a key safety concern, to a greater or lesser extent, in all of the designs that pre-mix hydrocarbons and molecular oxygen at elevated temperatures and pressures. The following embodiments present an alternative reactor arrangement that is expected to minimize the potential hazards in pre-mixing hydrocarbons and molecular oxygen.

These other embodiments involve partial oxidation reactors that have catalyst beds contained or enclosed within porous or perforated walls of tubes, or conduits, or pipes, or cylinders, or sheets, inside the reactor vessel. Hydrocarbon gas comprising a combustible such as methane, other gaseous hydrocarbons, any mixture thereof such as natural gas, a steam/methane mixture, a $CO_2$/methane mixture, or a steam/$CO_2$/methane mixture, are injected into the catalyst beds while molecular oxygen ($O_2$) is supplied to the shell side of the vessel surrounding these catalyst beds. These walls containing the catalyst beds are porous or perforated, allowing molecular oxygen to flow from the shell side of the vessel through the perforated walls into the catalyst bed(s) contained therein. In this arrangement, the hydrocarbon gas does not come in direct contact with the $O_2$ feed until it contacts the catalyst bed. The perforated walls have holes of varying sizes, numbers, and pitch along the height, offering varying percentages of open area as a function of bed height. Porous walls may have a porosity offering varying percentages of open area as a function of bed height. Separation of the two-reactant streams before reaction, followed by distribution and mixing within the catalyst beds, is simultaneously and appropriately achieved by this arrangement.

Figure 3A:
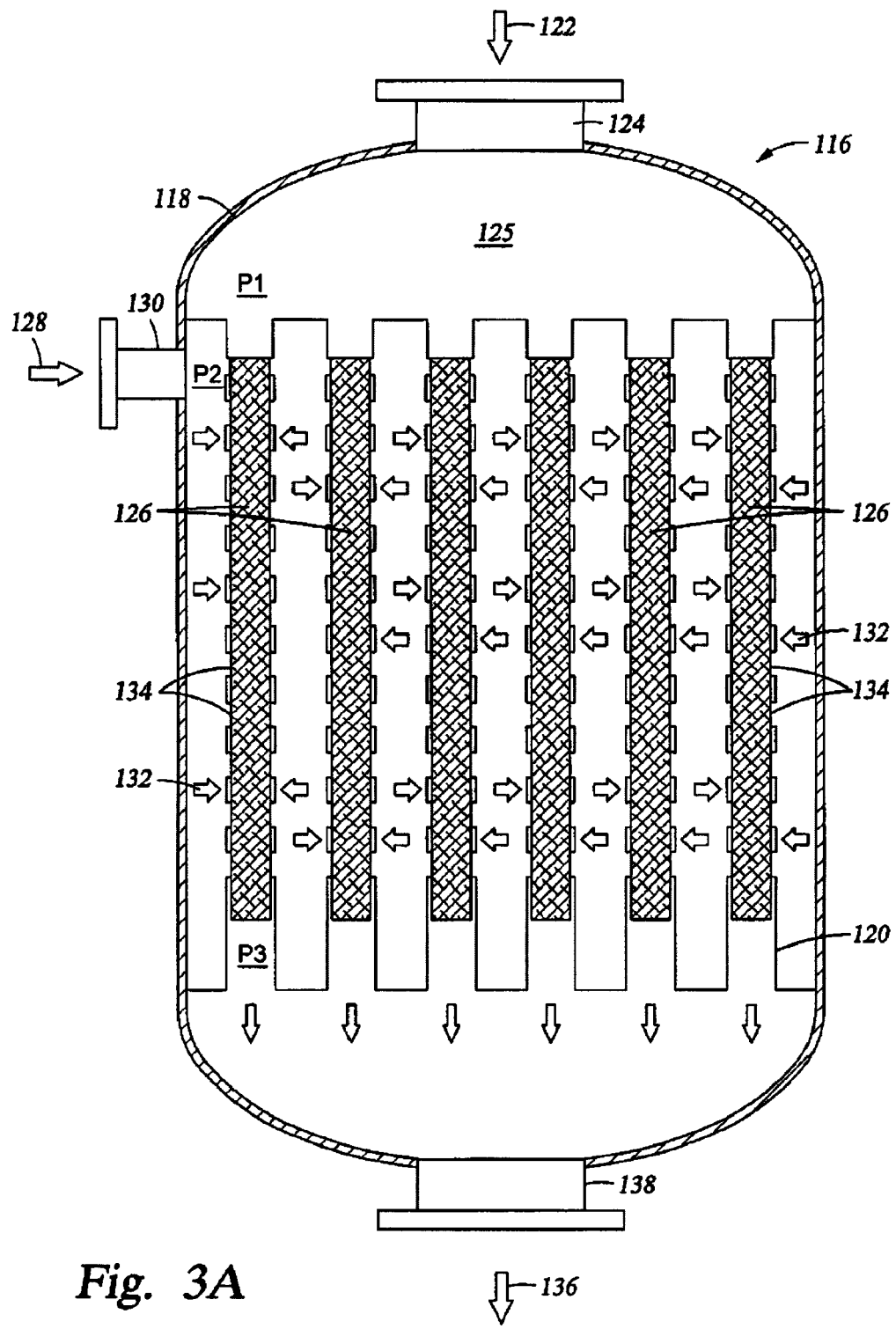
FIGS. 3A-3E represent one embodiment of a reactor comprising an internal structure with perforated walls enclosing reaction zones and a single oxygen chamber surrounding said reaction zones.

A first embodiment of a porous or perforated wall reactor is shown in FIG. 3A (elevation view of reactor 116) and FIGS. 3B, 3C, 3D and 3E (plan views with porous tubes, perforated tubes, porous plates, or perforated plates). Reactor 116 includes an outer shell 118 and an internal structure 120. A hydrocarbon gas 122 is injected into reactor 116 through inlet 124. The hydrocarbon gas 122 is distributed by upper manifold 125 into a plurality of catalyst beds 126 maintained within walls 127 in the internal structure 120. An oxygen-containing stream 128 is injected in the exterior of internal structure 120 through inlet 130 into an oxidant chamber 132 (on the shell side of the reactor 116) at a pressure (P2) greater than the pressure (P1) within catalyst beds 126. Walls 127 are dividing elements, which separate the catalyst beds, 126 and oxidant chamber 132 and provide a mass-transfer means from the oxidant chamber 132 to the catalyst beds 126. When walls 127 are in cylindrical form (such as tubes, pipes, conduits, and the like), catalyst beds 126 comprise at least a portion of the inner lumen of tubular walls 127. The oxygen-containing stream 128 fills the chamber 132 surrounding the plurality of beds 126 and penetrates into the beds through a plurality of perforations 134 through the walls 127 of internal structure 120.

Although not illustrated, the oxygen-containing stream 128 could be supplied to chamber 132 by a plurality of inlets 130. The inlets are preferably (although not necessarily) equally spaced across the circumference of shell 118 so as to evenly distribute the oxygen-containing stream 128 within chamber 132. Although not shown, the oxygen-containing stream 128 could be distributed by a manifold connected to inlet 130, said manifold delivering a multitude of oxygen-containing streams in chamber 132 on the exterior sides of the catalytic beds 126.

Figure 3B:
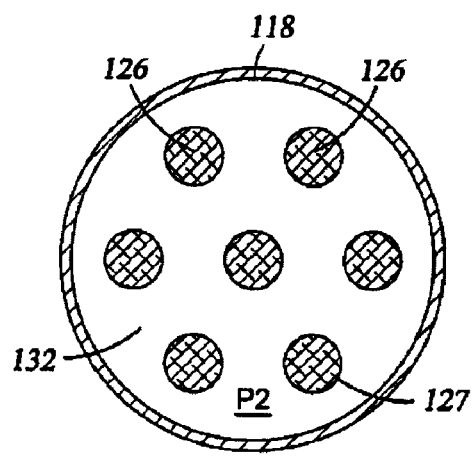

FIG. 3B illustrates a plan view of the structure 120 inside reactor outer shell 118 of a circular cross section, wherein the catalytic beds 126 are comprised in the lumen of porous tubes 127, each porous tube being surrounded by the oxygen chamber 132 filled with the oxygen-containing gas and maintained at the pressure P2.

Figure 3C:
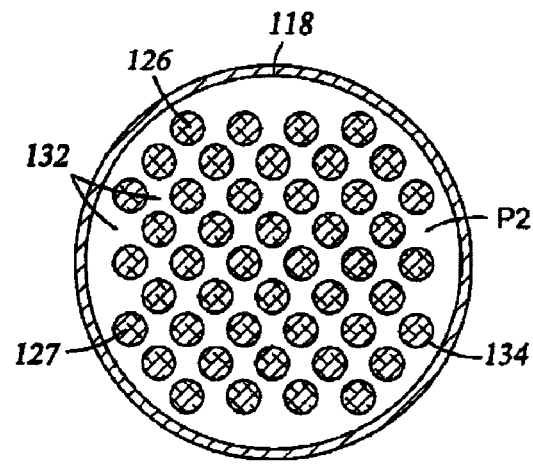

Similarly to FIG. 3B, FIG. 3C illustrates a plan view of the structure 120 inside outer shell 118 of a circular cross section, wherein the catalytic beds 126 are enclosed within the lumen of perforated tubes with perforations 134, each perforated tube being surrounded by the oxygen chamber 132 filled with the oxygen-containing gas and maintained at the pressure P2.

Figure 3D:
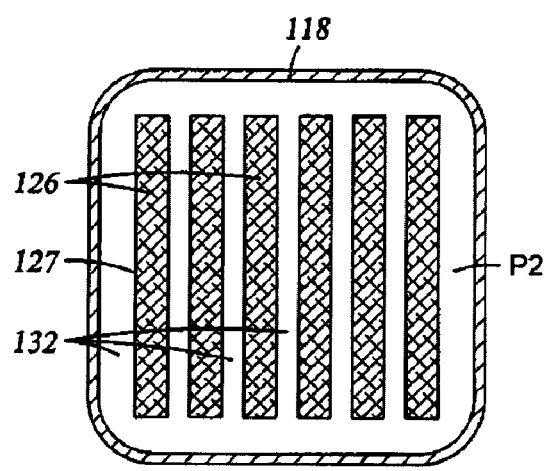

FIG. 3D illustrates a plan view of the structure 120 inside outer shell 118 of a rounded rectangle-shaped cross section, wherein the catalytic beds 126 are enclosed by porous sheets 127, each porous sheet being surrounded by the oxygen chamber 132 filled with the oxygen-containing gas and maintained at the pressure P2.

Figure 3E:
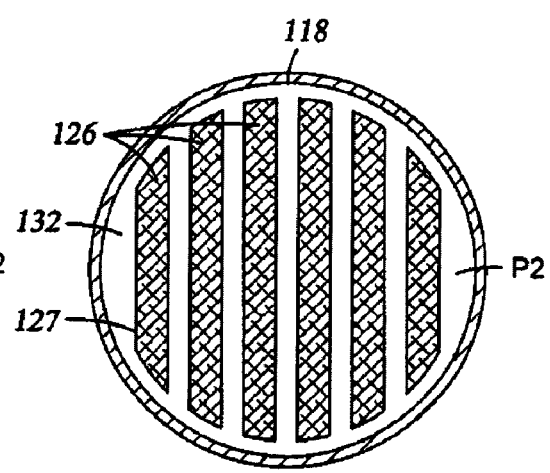

Similarly to FIG. 3D, FIG. 3E illustrates a plan view of the structure 120 inside outer shell 118 of a circular cross section, wherein the catalytic beds 126 are enclosed by perforated sheets 127, each perforated sheet being surrounded by the oxygen chamber 132 filled with the oxygen-containing gas and maintained at the pressure P2.

Thus, as hydrocarbon gas 122 flows downward through catalyst beds 126, it mixes with oxygen-containing stream 128 that enters the beds through wall perforations 134 of internal structure 120. The reactant gases mix within each of the catalyst beds and generate ultimately a products stream 136 which exits the reactor 116 through reactor outlet 138. It should be understood that the catalyst beds 126 could have different geometries and/or configurations. The catalyst beds 126 could have various cross-sectional shapes, such as circular, square, rectangular, hexagonal, trilobe, and any other regular/irregular shapes. Thus the catalyst beds 126 could comprise cones, rods, cylinders (as shown in FIGS. 3B and 3C), sheets, parallelepipeds, or plates (shown in FIGS. 3C and 3D), and the like. The catalytic beds could comprise different catalyst structures such as monolithic or divided (such as particulates, particles, spheres, pills, pastilles, and the like).

In preferred embodiments, the pressure differential from the chamber 132 to catalytic beds dictates the flow rate of the oxygen-containing stream 128 from chamber 132 through perforations 134 to beds 126. It should be noted that there should be a pressure drop along each of the catalyst beds 126 so that the pressure P3 of the effluent gas exiting one catalytic bed 126 should be lower than the inlet pressure P1 of the hydrocarbon gas 122. In order to continually provide flow of the oxygen-containing gas 128 from chamber 132 to beds 126, one should also maintain the pressure P2 of chamber 132 filled with the oxygen-containing gas 128 at a value greater than P1 and P3.

Figure 4A:
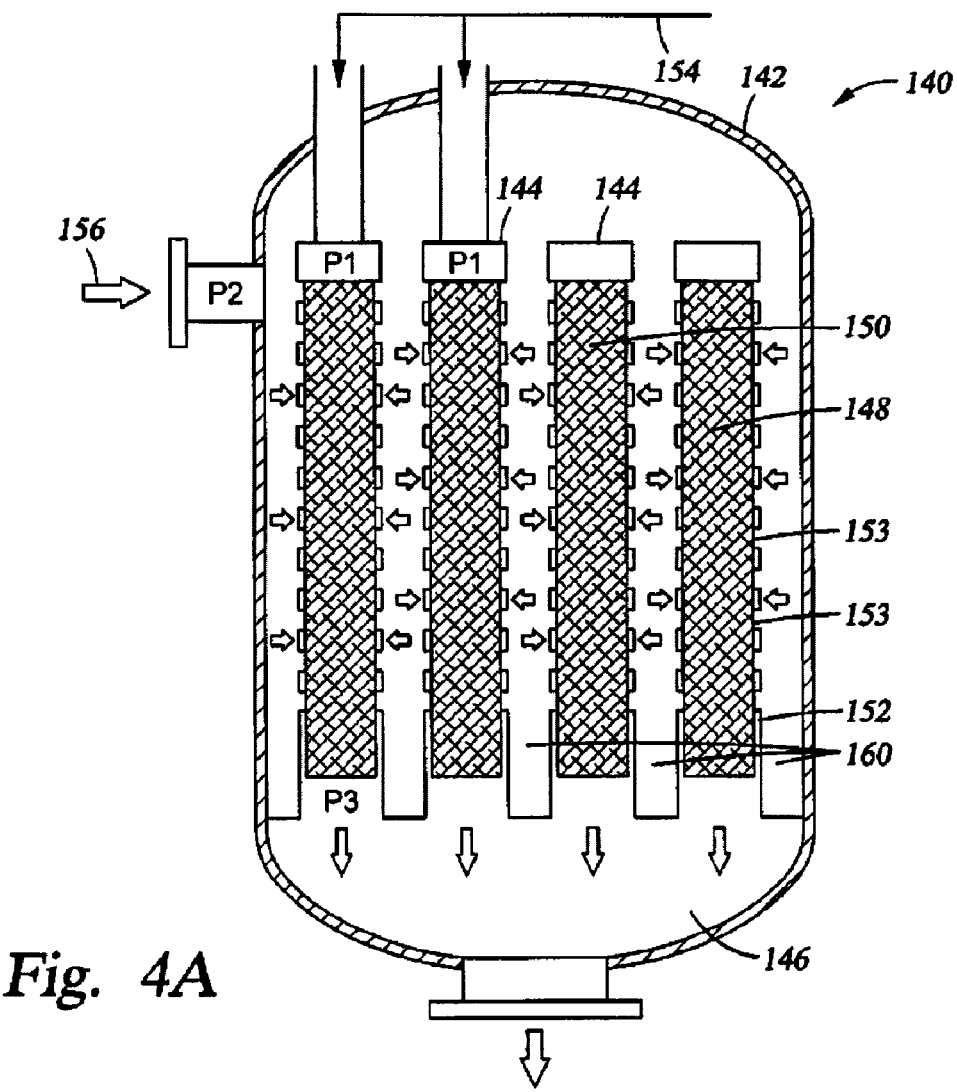
FIGS. 4A-4B represent one embodiment of a reactor comprising concentric internal structures with perforated walls.

Another embodiment of a perforated wall reactor comprising a specific catalytic bed structure is shown in FIGS. 4A (elevation view with a single $O_2$ chamber) and 4B (plan view of FIG. 4A). Reactor 140 includes an outer shell 142 having an upper plenum 144 and a lower plenum 146 connected to an outer annular catalyst bed 148 and inner annular catalyst bed 150.

One objective of the porous or perforated wall arrangements is to distribute the molecular oxygen comprised in the oxygen-containing feed such that the hydrocarbon-to-oxygen molar ratio at any point along the bed height stays outside the explosion limit, for example less than 2-5%. An inert packing could be provided at the top of the catalyst beds so that the hydrocarbon gas is distributed before contact with the catalyst. The limited molecular oxygen supply by such managed delivery also allows the control of the high peak bed temperature, which is expected to improve catalyst life and performance.

The number and size of perforations per unit cross-section of the walls along the height of each wall may vary in such a way that the total flow of oxygen-containing gas stream is injected and distributed along the height as desired. The oxygen-containing gas entering the catalyst bed near the bottom of the reactor will have a significantly lower residence time than that of the oxygen containing gas entering on the upper end. The diameter and/or thickness of the catalyst beds are preferably selected so as to achieve sufficient horizontal penetration of the oxygen into the catalyst bed. The differential pressure across the perforated or porous walls is maintained with the beds at a lower pressure than the supplied oxygen gas stream and can also be controlled to achieve desired permeation rate of the oxygen into the catalyst bed.

Figure 5A:
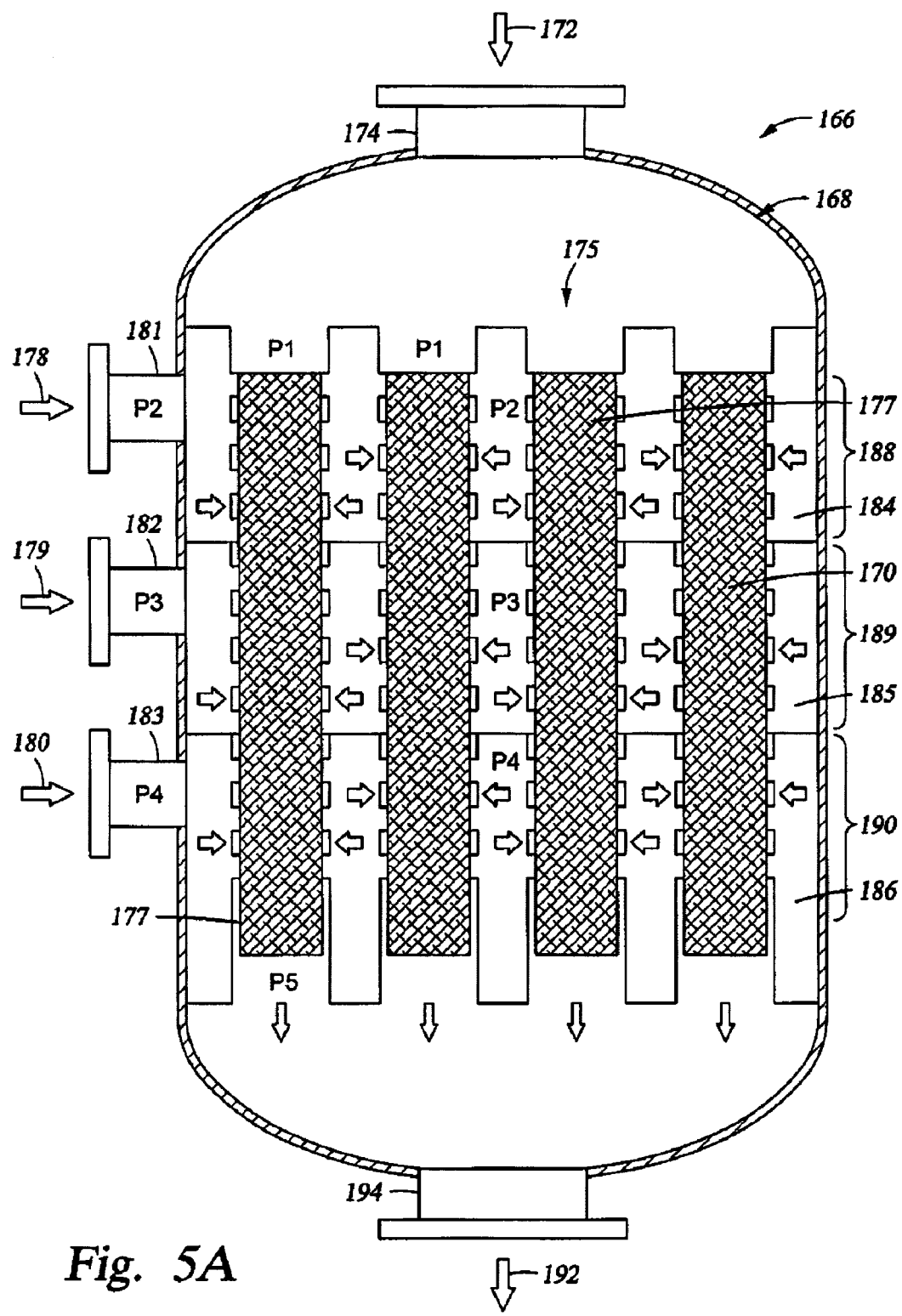
FIGS. 5A-5B represent embodiments of a reactor comprising perforated walls enclosing reaction blocks in series, a plurality of oxidant inlets and a plurality of oxygen chambers, each of which surrounds a reaction block.
Figure 5B:
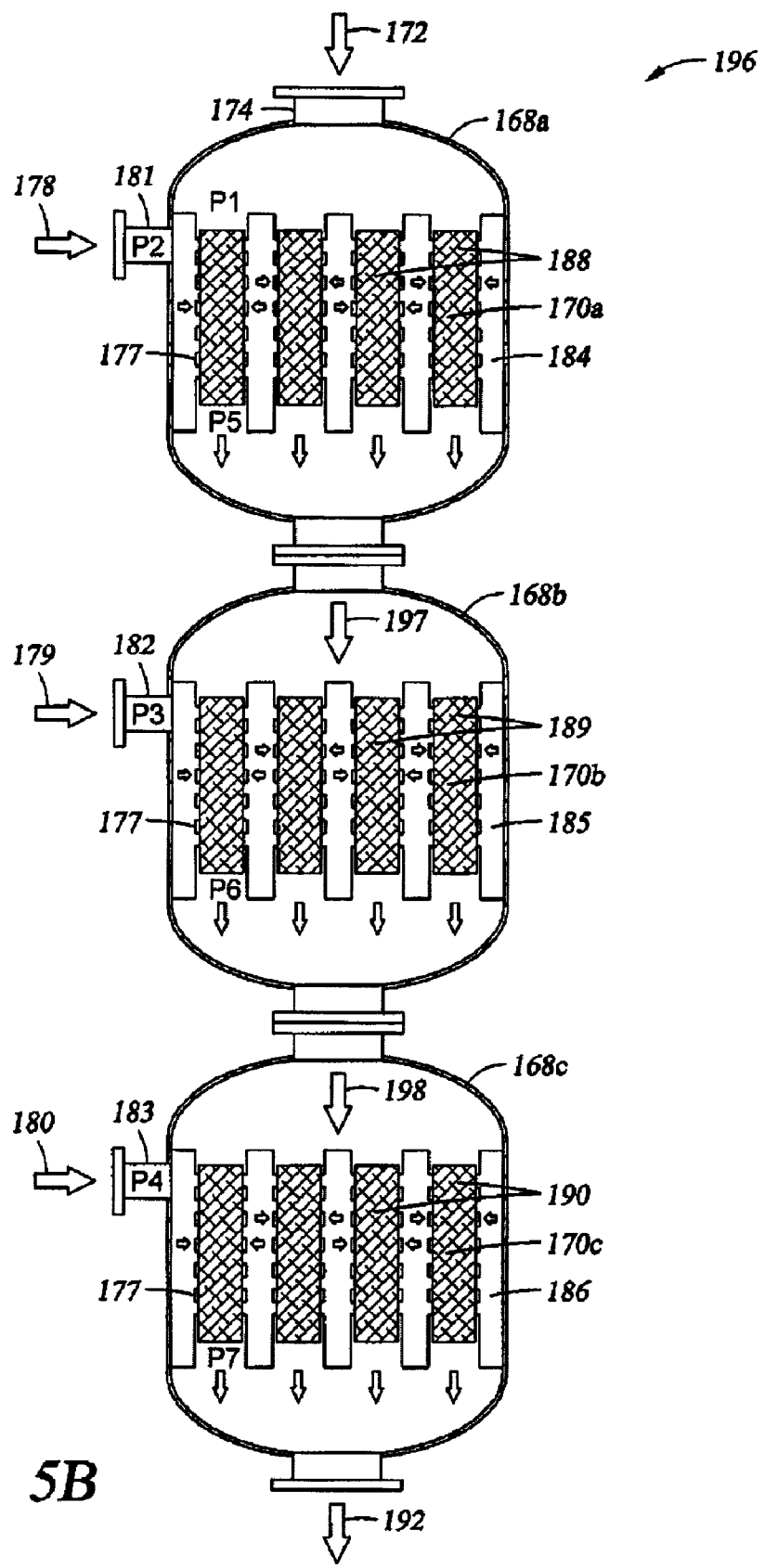

In alternate embodiments, the oxygen injection can be further controlled along the catalyst bed by providing a plurality of oxygen chambers of various pressures so as to create varying pressures gradients along the catalytic beds such as illustrated in FIGS. 5A and 5B. FIG. 5A illustrates such embodiment by providing a plurality of oxygen chambers of varying pressures surrounding the catalyst beds maintained at substantially similar pressures. Reactor 166 includes one outer shell 168 and a plurality of catalyst beds 170. A hydrocarbon gas 172 is injected into reactor 166 through inlet 174. The hydrocarbon gas 172 is distributed by upper manifold 175 into the plurality of catalyst beds 170 maintained within perforated or porous walls 177. Three oxygen-containing stream 178, 179, 180 are injected separately through inlets 181, 182, 183 into oxygen chambers 184, 185, 186, respectively at a pressure (P2, P3, P4 respectively) greater than the pressure (between inlet P1 and outlet P5) within catalyst beds 170. Walls 177 are dividing elements, which separate the catalyst beds 170 and respective chambers 184, 185, 186 and provide a mass-transfer means from the separate oxygen chambers 184, 185, 186 to the portions of the catalyst beds 170 respectively surrounded by each oxygen chamber. The oxygen-containing stream 178 fills the chamber 184 surrounding the top portion 188 of each of the plurality of beds 150 and penetrates into the top portion 188 of each bed through perforations or pores through the walls 177. Similarly, the oxygen-containing stream 179 fills the chamber 185 surrounding the middle portion 189 of the plurality of beds 150 and penetrates into the middle portion 189 of beds through perforations or pores of walls 177; and the oxygen-containing stream 180 fills the chamber 186 surrounding the bottom portion 190 of the plurality of beds 150 and penetrates into the bottom portion 190 of beds through perforations or pores of walls 177. In this manner, the pressures maintained in the respective oxygen chambers. One of the main advantages of this arrangement is the improved control of oxygen delivery along the catalytic beds due to the ability to vary the pressure differential between one oxygen chamber and the respective portions of the beds surrounded by the same oxygen chamber. The reactants gases mix within the catalyst beds 170, react and generate ultimately a products stream 192 which exits the reactor 166 through reactor outlet 194.

In preferred embodiments, the pressure differential from each of the chambers 184, 185, 186 to their respective portions 188, 189, 190 of the catalytic beds 170 dictates the flow rate of the respective oxygen-containing streams 178, 179, 180 through perforated walls 177. It should be noted that there should be a pressure drop along each of the catalyst beds 170 so that the pressure P5 of the effluent gas exiting one catalytic bed 170 should be lower than the inlet pressure P1 of the hydrocarbon gas 172. In order to continually provide flow of the oxygen-containing streams 178, 179, 180 from respective chambers 184, 185, 186 to respective portions 188, 189, 190 of the catalytic beds 170, one should preferably maintain the pressure P2 of chamber 184, P3 of chamber 185, and P3 of chamber 186 filled with their respective oxygen-containing streams 178, 179, 180 at a value greater than P1 and P5.

In some embodiments, the oxygen-containing streams 178, 179, 180 have similar $O_2$ content while having different pressures. In other embodiments, the oxygen-containing streams 178, 179, 180 have different $O_2$ content while having similar pressures. In yet alternate embodiments, the oxygen containing streams 178, 179, 180 have different $O_2$ contents and pressures. In preferred embodiments, the oxygen-containing stream 178 provides a greater mass flow of $O_2$ permeated to portion 188 of beds 170 than the other oxygen-containing streams 179, 180 feeding the downstream portions 189, 190 of beds 170.

FIG. 5B also illustrates a plurality of oxygen chambers of varying pressures surrounding the catalyst beds maintained at substantially similar pressures albeit each oxygen chamber is enclosed in a separate outer shell. Reactor 196 includes three outer shells 168a, 168b, and 168c and a plurality of catalyst beds 170a, 170b, and 170c comprised respectively in each shell. The plurality of catalyst beds 170a, 170b, and 170c are surrounded by their respective oxygen chambers 184, 185, and 186, and define three separate reaction blocks 188, 189, and 190 within their respective shell 168a, 168b, and 168c, respectively. Similarly to FIG. 5A, hydrocarbon gas 172 is fed into reactor 196 through inlet 174. The hydrocarbon gas 172 is distributed to the plurality of catalyst beds 170a maintained within perforated or porous walls 177. One oxygen-containing stream 178 is injected separately through inlet 181 into oxygen chamber 184 at a pressure (P2) greater than the outlet pressure (P5) within catalyst beds 170a. Similarly, another oxygen-containing stream 179 is injected separately through inlet 182 into oxygen chamber 185 at a pressure (P3) greater than the outlet pressure (P6) of catalyst beds 170b; while another oxygen-containing stream 180 is injected separately through inlet 183 into oxygen chamber 186 at a pressure (P4) greater than the outlet pressure (P7) of catalyst beds 170c. Walls 177 are dividing elements, which separate each of the catalyst beds 170c, 170b, and 170c from their respective surrounding oxygen chambers 184, 185, 186 and provide a mass-transfer means from each of the oxygen chambers to their respective catalyst beds. The reactants gases (hydrocarbon gas 172 and oxygen gas from stream 178) mix within the catalyst beds 170a, react and generate ultimately an effluent product stream 197, which exits shell 168a through an outlet. The effluent product stream 197 contains reaction products as well as unconverted hydrocarbon gas. The effluent product stream 197 is directed through an inlet of shell 168b, and is fed to reaction block 189 and distributed to the plurality of catalyst beds 170b. The reactants gases (hydrocarbon gas from effluent product stream 197 and oxygen gas from stream 179) mix within the catalyst beds 170b, react and generate ultimately an effluent product stream 198 which exits shell 168b through an outlet. The effluent product stream 198 contains reaction products as well as unconverted hydrocarbon gas. The effluent product stream 198 is directed through an inlet of shell 168c, and is fed to reaction block 190 and distributed to the plurality of catalyst beds 170c. The reactant gases (hydrocarbon gas from effluent product stream 198 and oxygen gas from stream 180) mix within the catalyst beds 170c, react, and generate ultimately an product stream 192. Product stream 192 exits through an outlet of shell 168c and ultimately leaves reactor 196.

The main difference of FIG. 5B compared to that of 5A is that reactor 196 contains three separate vessels, each of them comprising catalyst beds enclosed by porous or perforated walls through which the oxygen-containing gas passes, said walls being surrounded by an oxygen chamber which is fed by a separate oxygen-containing stream. One of the main advantages of this embodiment is that it facilitates the use of different pressures in the oxygen chambers so as to improve control of the gas temperature of each effluent product stream exiting the reaction blocks. A temperature measuring means (such as a thermocouple) may be located within the lower plenum of each shell 168a, 168b, and 168c so as to measure the gas temperature of the effluent streams 197, 198, and 192 respectively. The measured temperature of a gas effluent can be relayed to a control system which will compare it to a temperature setpoint, which is within a temperature range desirable to maintain the effluent gas temperature below the predetermined maximum gas temperature for the given catalyst composition, thermal stability and feed composition. The control system may then change the pressure in the oxygen chamber so that the temperature of the gas effluent approaches the temperature setpoint.

This arrangement of multitude of oxygen chambers illustrated in FIGS. 5A and 5B allows the control of the gas effluent temperature of one reaction block independently of the other reaction blocks upstream or downstream of said reaction block.

Thus, reactors 166 and 196 of FIGS. 5A and 5B provide a system with multiple reaction blocks (i.e., comprising portions of continuous catalyst beds) surrounded by a plurality of oxygen chambers within a single vessel or shell, wherein the multiple reaction blocks are in direct fluid communication and connected in series, but wherein the plurality of oxygen chambers are not in fluid communication with each other so as to maintain their respective pressure and $O_2$ content. Reactor 196 of FIG. 5B provide a system with multiple reaction blocks (i.e., each comprising a plurality of catalyst beds) connected in series, each of which is surrounded by a oxygen chamber and contained with a separate vessel or shell so that the multiple reaction blocks are not in direct fluid communication, and wherein the separate oxygen chambers are not in fluid communication with each other so as to maintain their respective pressure and $O_2$ content. In contrast to the use of a single oxygen chamber as described in FIGS. 3 and 4, the total oxygen need of the systems of FIGS. 5A and 5B can be divided and permeated to different reaction blocks in series (188, 189, 190) surrounded by separate oxygen chambers (184, 185, 186) wherein the reaction blocks comprise catalyst beds or portions thereof, such that the peak temperature in each reaction block is controlled primarily by the amount of oxygen permeated to that reaction block.

More specifically, the gas effluent temperature in a partial oxidation block may be controlled by performing the following steps as described for portion 188 of catalyst beds 150 (most upstream reaction block) as a non-limiting example: 1) measuring the gas effluent temperature of one reaction block 188; 2) comparing the measured gas effluent temperature to a desirable gas effluent temperature predetermined setpoint equal to or lower than a maximum gas temperature (such as for example selected between 900° C. and 1600° C., or between 1000° C. and 1400° C., or between 1100° C. and 1300° C.); and 3) adjusting the $O_2$ mass flow of the oxygen-containing stream 178 to the oxidant gas inlet 181 feeding the partial oxidation block so that the amount of oxygen permeated through perforated or porous walls 177 is suitable to obtaining a gas effluent temperature approaching or equal to the desirable setpoint. The flow rate or the pressure or the $O_2$ content of the oxygen-containing stream 178 or any combination of two or more, may be adjusted to change the $O_2$ mass flow permeated to the reaction block 188 in order to reach the desired setpoint of a temperature within the reaction block 188, such as that of the gas effluent exiting reaction block 188 before entering the immediate downstream reaction block 189. For example, it is envisioned that the gas effluent temperature could be measured near or at the exit of reaction block 188. If the measured gas effluent temperature is lower than the desirable gas effluent temperature setpoint, the amount of $O_2$ fed to the partial oxidation block 188 may be increased. Conversely, if the measured gas effluent temperature is higher than the desirable gas effluent temperature setpoint, the amount of $O_2$ fed to the partial oxidation block 188 may be decreased. The exit temperature from each reaction block (portions 188, 189, 190) and particularly from the most downstream reaction block (portion 190) may be optimized to achieve near-complete hydrocarbon conversion along with high carbon monoxide and hydrogen selectivities. Another advantage of the embodiment of FIG. 5 is that it does not require added heat.

Figure 6A:
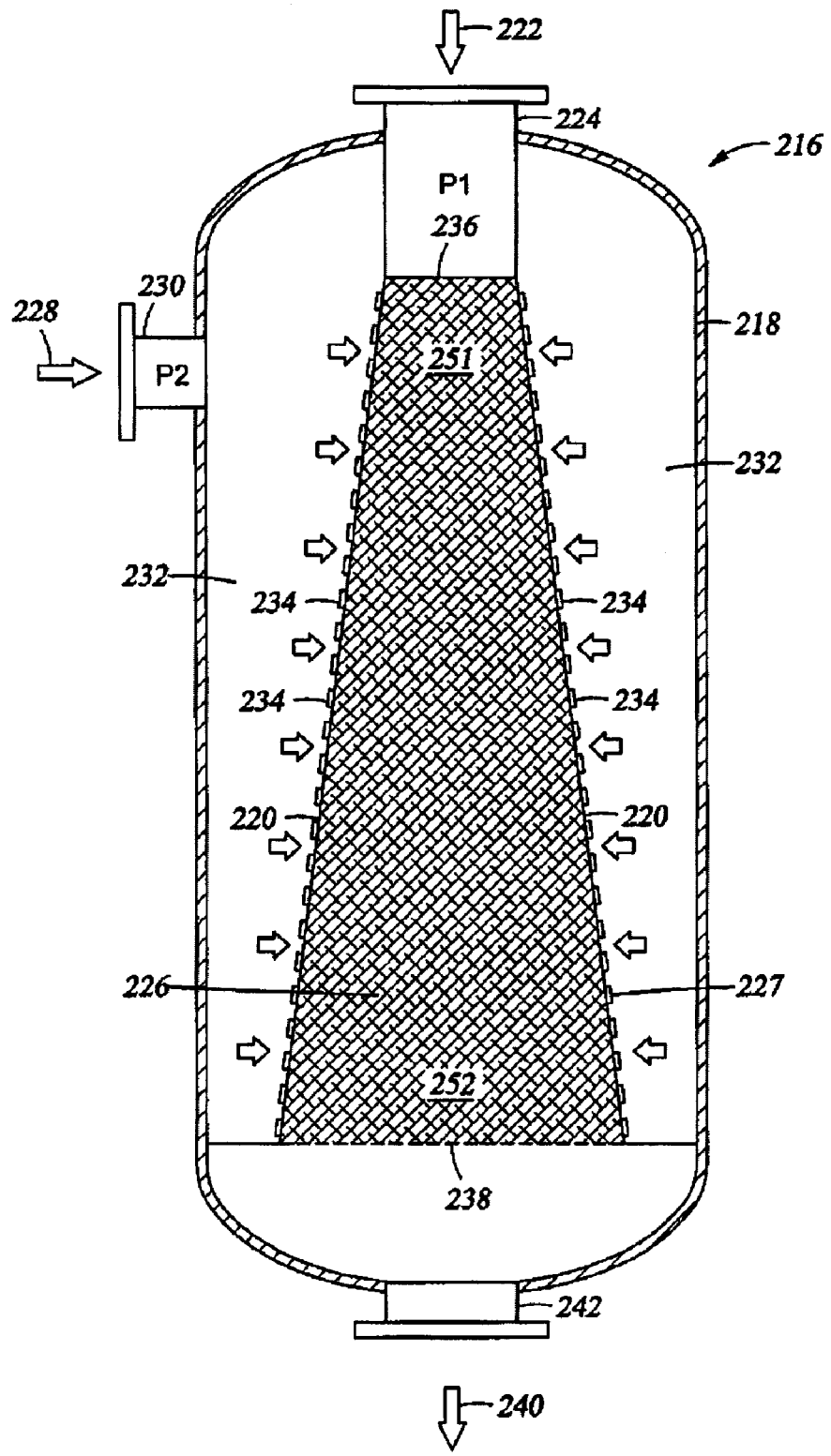
FIGS. 6A-6B represent different embodiments of reactors comprising an inverted-cone internal structure.

The oxygen distribution can also be controlled by varying the shape of the catalyst beds. For example, a catalyst bed can be provided that expands in diameter as the reactants move through the bed. An example of such design is shown in FIG. 6A. As the bed expands, the velocity of the reactants slows, decreasing velocities and increasing residence times. If additional oxygen is also added to the reaction at this point the temperature can be increased or maintained, leading to an improved reforming process.

One embodiment of a catalytic partial oxidation reactor, which has a catalyst bed with increasing diameter as the reactants move through the bed (i.e., increased residence time), is represented as an inverted-cone perforated-wall reactor as shown in FIG. 6A. Reactor 216 includes an outer shell 218 and an internal structure 220. A hydrocarbon gas 222 is injected into reactor 216 through inlet 224. The hydrocarbon gas 222 is fed to a catalyst bed 226 maintained by perforated walls 227 in the internal structure 220. An oxygen-containing stream 228 is injected in the exterior of internal structure 220 through inlet 230. The oxygen-containing stream 228 fills an oxygen chamber 232 surrounding the structure 220 enclosing the catalyst bed 226 and penetrates into the catalyst bed 226 through a plurality of perforations 234 through the walls 227 of internal structure 220. The walls 227 could have varying hole or perforation sizes, and has a varying pitch from the top 236 to the bottom 238 of the catalyst bed 226. In preferred embodiments of FIG. 6A, the cross-sectional area at the top 236 is smaller than the cross-sectional area at the bottom 238.

Thus as hydrocarbon gas 222 flows downward through catalyst bed 226 it mixes with oxygen-containing stream 228 that enters the beds through wall perforations 234 of internal structure 220. The reactant gases mix within the catalyst bed 226 and generate ultimately a products stream 240, which exits the reactor 216 through reactor outlet 242. As the hydrocarbon flows downward, it first encounters a reaction zone 251 for which the gas velocity is high, the reactant contact time with catalyst is short, to then pass through a reaction zone 252 for which the gas velocity is slower and the contact time with catalyst is longer. Reaction zone 251 favors combustion or partial oxidation reaction, whereas reaction zone 252 favors reforming reaction.

Because the oxygen injection or permeation into the catalyst bed can be controlled, opportunities for improvement of the catalyst are also now available. The control of oxygen injection or permeation (such as the temperature control system described in the discussion of FIGS. 2, 5a and 5b) allows for control of the reaction that is taking place within a certain reaction zone or reaction block in the reactor. Therefore, it may be possible to vary the catalyst composition for different reaction zones or different reaction blocks within a given catalyst bed. For example, in a reaction zone where substantial reforming reactions are occurring such as in reaction zone 252 as shown in FIG. 6A, a catalyst could be chosen to optimize these reactions.

The basic concept of a perforated or porous wall reactor is a precursor to a membrane wall reactor. If a suitable $O_2$ selective permeable membrane is available, an oxygen-containing stream comprising air, instead of molecular oxygen, can then be used, because the $O_2$ selective permeable membrane wall would act both as an oxygen separator and a distributor along the bed length. Thus, the high cost of an oxygen plant and the safety concerns of operating with pure molecular oxygen would be eliminated.

Figure 6B:
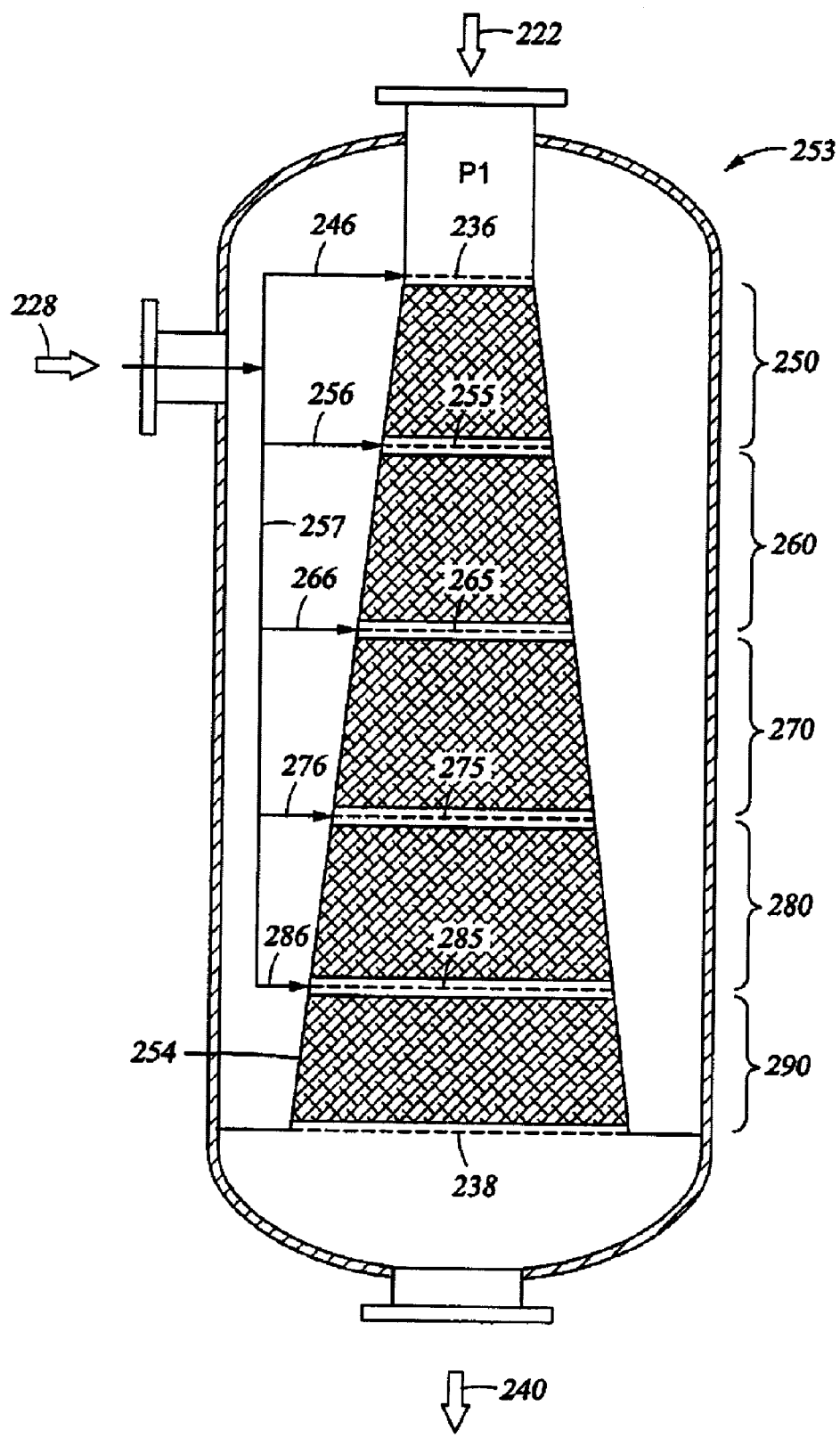

Another embodiment of a catalytic partial oxidation reactor, which has a catalyst bed with increasing cross-sectional area (i.e., for example, increasing diameter) as the reactants move through the bed (i.e., increased residence time), is represented as an inverted-cone multiple-bed reaction block with multiple oxygen injections as shown in FIG. 6B. A reactor 253 comprises a plurality of reaction zones 250, 260, 270, 280, and 290 in series, each comprising a catalyst bed, and wherein zone 250 is the most upstream reaction zone and zone 290 is the most downstream reaction zone. The reaction zones 250, 260, 270, 280, 290 are contained within an inverted-cone non-porous structure 254 (i.e., the walls of structure 254 do not allow mass transfer in or out of the reaction zones). Structure 254 preferably has a varying pitch from the top 236 of reaction zone 250 to the bottom 238 of reaction zone 290. In preferred embodiments of FIG. 6B, the cross-sectional area at the top 236 is smaller than the cross-sectional area at the bottom 238. A hydrocarbon gas 222 is fed to the most-upstream reaction zone 250 (at top 236). Between reaction zones 250 and 260, there is an interbed region 255. Similarly, interbed region 265 is between reaction zones 260 and 270; interbed region 275 is between reaction zones 270 and 280; and interbed region 285 is between reaction zones 280 and 290. A gas distribution system 246 is located near the top 236 of reaction zone 250. Interbed regions 255, 265, 275, and 285 also include gas distribution systems 256, 266, 276, and 286. Gas distribution systems 246, 256, 266, 276, and 286 are all connected to a manifold 257 delivering an oxygen-containing gas 228, such that each of the gas distribution systems 246, 256, 266, 276, and 286 can distribute a portion of the oxygen-containing gas 228 to the reaction zone located immediately downstream of the gas distribution system. Gas distribution systems 256, 266, 276, and 286 may further be suitable for distributing the effluent gas (not shown) from their immediately upstream reaction zone. Gas distribution systems 246, 256, 266, 276, and 286 may contain baffles, nozzles, sparging rings, and other gas distribution equipment. Similarly to FIG. 6A with reaction zones 251 and 252, reaction zone 250 of FIG. 6B may be configured so as to favor partial oxidation with a short gas residence time, while reaction zone 290 of FIG. 6B may be configured so as to favor reforming with a longer gas residence time. In preferred embodiments, hydrocarbon gas 222 is injected through inlet 82 at a hydrocarbon gas inlet temperature less than about 550° C.; more preferably less than 400° C.; still more preferably between 100° C. and 400° C. In alternate embodiments, the initial reactant gas entering reaction zone 250 which comprises the hydrocarbon gas 222 and the portion of stream 228 delivered by distribution system 246 upstream of reaction zone 250 preferably has a reactant gas temperature between about 100° C. and 900° C.; more preferably between about 100° C. and 550° C.; still more preferably between about 300° C. and 500° C.; yet still more preferably between about 300° C. and about 400° C.

Figure 4B:
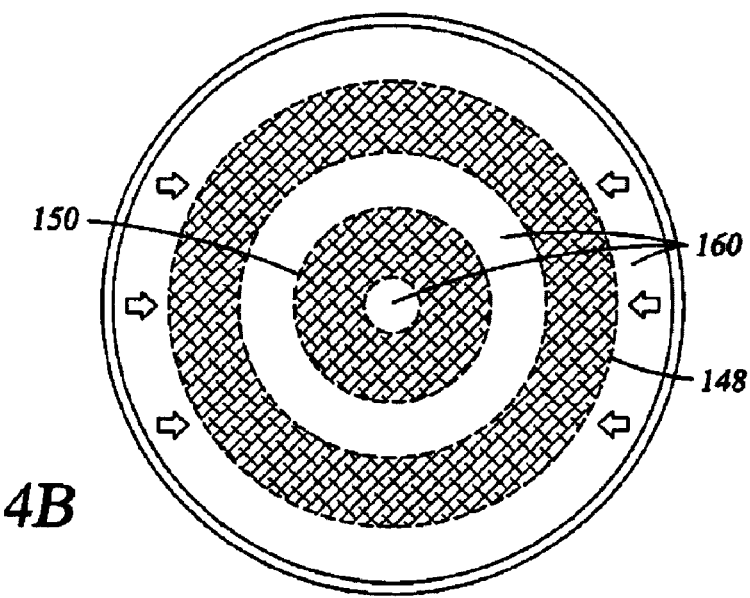

Another advantage of the multi-bed design, shown in FIGS. 3, 5B, and 6B is the absence of any major scale-up concern, because single-bed tests would provide virtually all the process information necessary for a large-scale commercial reactor design. The single or multiple annular bed design, shown in FIGS. 4A and 4B, is also devoid of any major scale-up concern, while perhaps simpler to build and operate due to the less numerous and larger beds.

Figure 7:
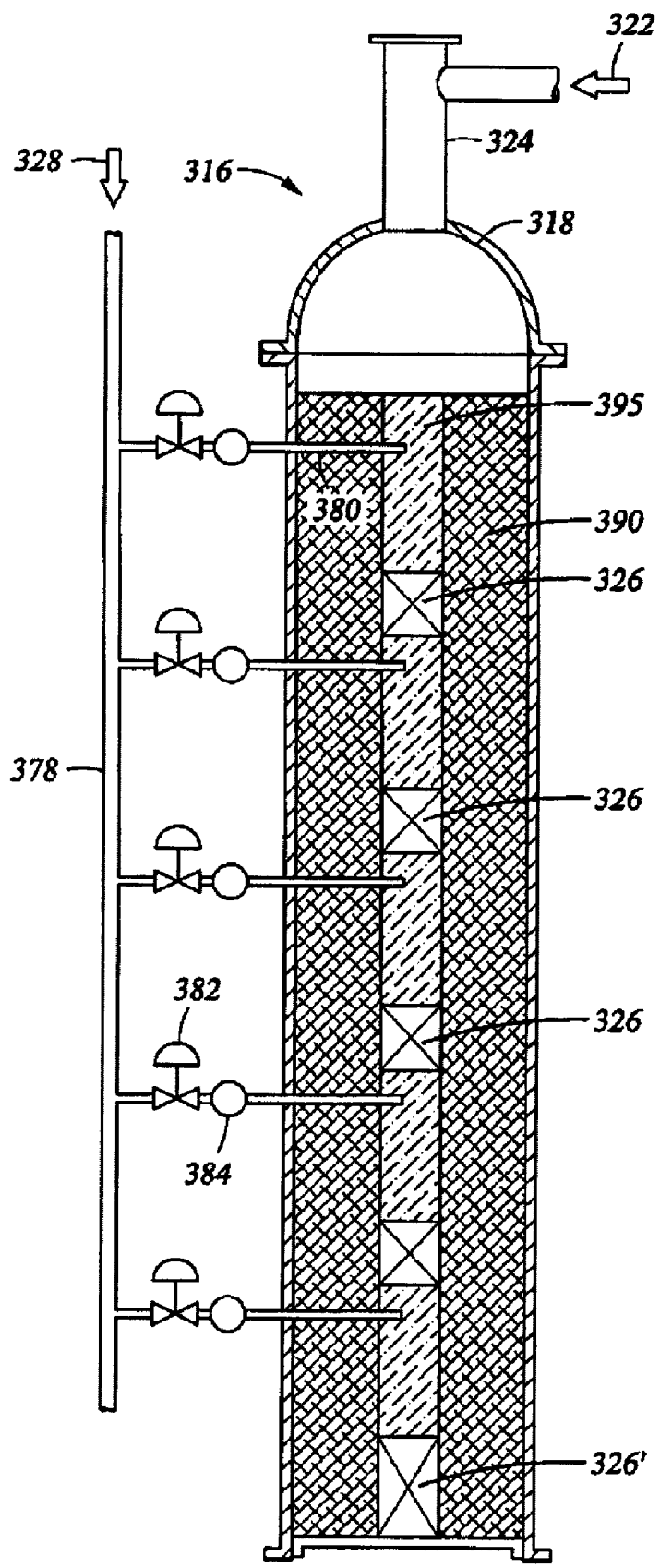
FIG. 7 is a schematic representation of another embodiment of a staged injection reactor with a thick non-porous insulation barrier.

Another embodiment of a catalytic partial oxidation reactor, which has a multiple oxygen injections, is represented in FIG. 7. Reactor 316 includes an outer shell 318, and a series of five catalytic zones 326. A layer of inert packing 395 is located upstream of each catalytic zone 326 to aid as mixing and distribution of gases. Catalytic zones 326 and inert packing 395 are surrounded by a thick and nonporous insulation barrier 390. A hydrocarbon gas 322 is injected into reactor 316 through inlet 324. An oxygen-containing stream 328 is divided via a gas manifold 378 and distributed via gas injection tubes 380 within the inert packing 395 placed upstream of each catalytic zone 326. A valve 382 and a flow meter 384 are preferably located on each gas injection tube 380 to control and monitor gas flow through each gas injection tube 380. Each divided oxygen-containing stream is premixed either with the incoming fresh hydrocarbon gas upstream of the first catalytic zone, or with the gas exiting a preceding catalytic zone. The last catalytic zone shown as 326' may have a larger volume (i.e., increased bed depth) to increase residence time to maximize conversion.

When employing either a monolith catalyst or a packed bed of divided catalyst, the surface area, depth of the catalyst bed, and gas flow rate (space velocity) are preferably chosen, or adjusted during operation, as applicable, so as to ensure the desired or optimal conversion efficiency and product selectivities. Under preferred CPOX promoting conditions with a methane feed the net partial oxidation of at least 90% of the $CH_4$ feed to CO and $H_2$ with a selectivity for CO and $H_2$ products of at least about 90% CO and 90% $H_2$ is achieved at least 2 atmospheres of pressure, preferably at least about 4 ATM, more preferably between about 4 ATM and about 50 ATM and at least about 20,000 $h^{-1}$ of GHSV, preferably at least about 50,000 $h^{-1}$.

The hydrocarbon reactant gas and the oxygen-containing stream may be passed over the catalyst at any of a variety of space velocities. Space velocities for the process, stated as gas hourly space velocity (GHSV), are in the range of about 20,000 to about 100,000,000 $h^{-1}$. Although for ease in comparison with prior art systems space velocities at standard conditions have been used to describe the present invention, it is well recognized in the art that residence time is the inverse of space velocity and that the disclosure of high space velocities corresponds to low residence times on the catalyst. "Space velocity," as that term is customarily used in chemical process descriptions, is typically expressed as volumetric gas hourly space velocity in units of $h^{-1}$.

Under these operating conditions, a flow rate of reactant gases is maintained sufficient to ensure a residence or dwell time of each portion of reactant gas mixture in contact with the catalyst of no more than 200 milliseconds, preferably less than 50 milliseconds, and still more preferably less than 20 milliseconds. A contact time of less than 10 milliseconds is highly preferred. The duration or degree of contact is preferably regulated so as to produce a favorable balance between competing reactions and to produce sufficient heat to maintain the catalyst at the desired temperature, but not exceeding a gas peak temperature of 1500° C.

In order to obtain the desired high space velocities, the process can be operated at atmospheric or superatmospheric pressures. The pressures may be in the range of about 100 kPa to about 4,000 kPa (about 1-40 atm), preferably from about 200 kPa to 3,000 kPa (about 2-30 atm).

The process is preferably operated at a temperature in the range of about 350° C. to about 1,500° C. More preferably, the gas temperature is maintained in the range 300° C.-1,450° C., as measured at the reactor outlet.

The product gas mixture emerging from the reaction zone of reactor is collected and may be routed directly into any of a variety of applications, preferably at pressure. One such application for the CO and $H_2$ product stream is for producing higher molecular weight hydrocarbon compounds using Fischer-Tropsch technology and/or for producing alcohols such as methanol using an alcohol synthesis plant.

The present invention has been disclosed in terms of its role in a catalytic partial oxidation process. It will be understood that the present invention has applicability in any catalytic reaction scheme, in which it is desired to mix or distribute reactants prior to contacting them with the catalyst, and particularly those reaction schemes in which it may be desired to heat or cool the reactant gases prior to contacting them with the catalyst. When one of the reactants is an oxygen-containing gas, exemplary reaction schemes include, in addition to partial oxidation of methane, oxidative dehydrogenation of gaseous hydrocarbons, and catalytic partial oxidation of hydrogen sulfide.

A large number of optional embodiments involving various reactor configurations and operational modes are possible. These configurations include, but are not limited to, packed beds, packed beds with nitrogen dilution, packed beds with steam and/or $CO_2$ dilution, multi-tubular fixed beds, multi-tubular annular double-wall fixed beds, diluted catalyst beds, packed beds with steam and/or $CO_2$ dilution followed by multi-tubular fixed beds, and multi-stage packed beds with inter-stage oxygen injection. Operational variables also include, but are not limited to, bed length and design, feed gas composition, temperature and pressure, gas throughput (space velocity), and heat transfer system design, e.g. like tube lengths, diameters and layouts as well as and heating/cooling media characteristics. Although the embodiments discussed herein are vertically arranged reactors. These concepts could be equally applied to horizontally arranged or inclined reactors.

EXAMPLES

Simulation tests based on computer modeling were performed to estimate the performance of multiple-oxygen injections to a multi-bed catalytic partial oxidation reactor to find the optimum concentration of oxygen in each stage and the optimum ranges of temperature at the inlet of each bed. For these Examples, the numbers of stages are 1 (for comparison purposes), 2, 3, and 5. In all cases, the hydrocarbon gas is methane, and the oxygen-containing gas is substantially pure molecular oxygen. For single-bed Examples (Ex. 1,2) used for comparison, methane and $O_2$ are premixed upstream of the sole catalyst bed to form a reactant gas stream with a molar ratio of carbon to molecular oxygen ($C:O_2$) of approximately 1.8:1 or 2.49:1. For more than two-oxygen injections and multiple-bed reactors (Examples 3-16), methane and $O_2$ are premixed upstream of the first catalyst bed (or first stage) to form a reactant gas stream with a molar ratio of carbon to molecular oxygen ($C:O_2$) of about 3:1 or about 4:1 for two and three staged $O_2$ injections (Examples 3-15), and a $C:O_2$ molar ratio of about 9:1 for five-staged $O_2$ injections (Example 16). In all Examples except for Example 7, the feed gas entering first catalytic bed has a temperature of 400° C. (550° C. for Example 7). The hydrocarbon gas flow rate is $1.24 \times 10^6$ $Ncm^3/s$ at normal pressure (1 ATM) and temperature (0° C.), and the overall oxygen flow rate is between $4.4 \times 10^5$ $Ncm^3/s$ and $7.0 \times 10^5$ $Ncm^3/s$ at normal pressure (1 ATM) and temperature (0° C.). Each catalyst bed has an internal diameter of 50.8 cm, a depth of 5.08 cm, and comprises catalyst particles of 1-mm size. The catalyst is assumed to have the same composition in all catalytic beds. The catalyst comprises rhodium and samarium (each 4% by weight) on a support comprising alumina.

Typical two-, three- and five-stage $O_2$ injection cases tested are compared with two single-injection bases Examples 1 and 2 in Table 1. The two, three or five sets of values shown in Table 1 correspond to conditions at each stage. It is assumed that $O_2$ injected in each intermediate stage mixes immediately with the product gases from the preceding stage. It should be noted that the mixed gas temperature upon $O_2$ injection (shown as feed temperature in each stage) can be controlled somewhat by the feed $O_2$ temperature. The feed $O_2$ is totally consumed at each stage.

Table 1 also shows the ratio of the reactant gas stream entering the first catalytic bed and the overall molar ratio of carbon-to-$O_2$. The overall $C:O_2$ molar ratio should be close to the stoichiometric ratio of 2:1 of the catalytic partial oxidation reaction (2), but can vary typically between about 1.8:1 and 2.5:1. Table 1 also lists the gas feed temperature, the estimated gas peak temperature and the gas exit temperature in ° C., as well as the hydrocarbon conversion ($CH_4$ Conv.), and CO selectivity (CO sel., %) and $H_2$ selectivity ($H_2$ Sel., %). The CO and $H_2$ selectivity are based on carbon and hydrogen, respectively, from only methane in the hydrocarbon feed.

The gas peak temperature for a single $O_2$ injection is typically estimated to be about 1918° C., whereas the gas peak temperature of two, three or five $O_2$ injections drops more than about 400° C. to a range between 1344° C. and 1513° C. Correspondingly, the exit temperature of the gaseous stream exiting the first stage falls from about 1082° C. with a single injection to a range between 796° C. and 844° C. for multiple injections. The CO selectivity is greatly improved with a staged oxygen injection as it is well above 90%, and in most cases above 94%, whereas, with the single injection, CO selectivity reaches only 78.7% and 84.8% for a $C:O_2$ ratio of 1.8:1 and 2.49:1 respectively. The $H_2$ selectivity seems less affected by the manner in which the oxygen is delivered.

TABLE 1

| Ex | # stages | | % $O_2$ | Total $O_2$ flow, Ncm3/s | Fresh feed flow in each stage, Ncm3/s | 1rst stage molar $C:O_2$ | Overall molar $C:O_2$ | Feed temp for each stage, ° C. | Est. gas peak temp, ° C. | Exit gas temp, ° C. | $CH_4$ conv, % | CO sel., % | $H_2$ sel., % |
|---|---|---|---|---|---|---|---|---|---|---|---|---|---|
| 1 | 1 | 1rst | 100 | $5.50 \times 10^5$ | $1.92 \times 10^6$ | 1.80 | 1.80 | 400 | 1918 | 1082 | 99.8 | 78.7 | 94.9 |
| 2 | 1 | 1rst | 100 | $4.41 \times 10^5$ | $1.73 \times 10^6$ | 2.49 | 2.49 | 400 | 1918 | 1082 | 75.4 | 84.8 | 94.0 |
| 3 | 2 | 1rst | 61 | $4.96 \times 10^5$ | $1.54 \times 10^6$ | 4.07 | 2.49 | 400 | 1344 | 796 | 41.9 | 90.9 | 92.4 |
|   |   | 2nd | 39 |   | $1.92 \times 10^5$ |   |   | 773 | 1341 | 892 | 71.9 | 94.5 | 94.4 |
| 4 | 2 | 1rst | 61 | $4.96 \times 10^5$ | $1.54 \times 10^6$ | 4.07 | 2.49 | 400 | 1344 | 796 | 41.9 | 90.9 | 92.4 |
|   |   | 2nd | 39 |   | $1.92 \times 10^5$ |   |   | 773 | 1341 | 1100 | 81.0 | 98.5 | 98.9 |
| 5 | 2 | 1rst | 56 | $5.44 \times 10^5$ | $1.54 \times 10^6$ | 4.07 | 2.27 | 400 | 1344 | 796 | 41.9 | 90.9 | 92.4 |
|   |   | 2nd | 44 |   | $2.40 \times 10^5$ |   |   | 768 | 1445 | 914 | 79.1 | 94.8 | 94.2 |
| 6 | 2 | 1rst | 56 | $5.44 \times 10^5$ | $1.54 \times 10^6$ | 4.07 | 2.27 | 400 | 1344 | 796 | 41.9 | 90.9 | 92.4 |
|   |   | 2nd | 44 |   | $2.40 \times 10^5$ |   |   | 768 | 1462 | 1100 | 88.3 | 98.3 | 98.6 |

TABLE 1-continued

| Ex | # stages | | % $O_2$ | Total $O_2$ flow, Ncm3/s | Fresh feed flow in each stage, Ncm3/s | 1rst stage molar C:$O_2$ | Overall molar C:$O_2$ | Feed temp for each stage, °C | Est. gas peak temp, °C | Exit gas temp, °C | CH$_4$ conv, % | CO sel., % | H$_2$ sel., % |
|---|---|---|---|---|---|---|---|---|---|---|---|---|---|
| 7 | 2 | 1rst | 56 | 5.44 × 105 | 1.54 × 106 | 4.07 | 2.27 | 550 | 1413 | 830 | 45.2 | 93.3 | 94.5 |
|   |   | 2nd | 44 |            | 2.40 × 105 |      |      | 810 | 1462 | 1100 | 88.5 | 97.9 | 98.4 |
| 8 | 2 | 1rst | 68 | 5.93 × 105 | 1.64 × 106 | 3.09 | 2.09 | 400 | 1513 | 844 | 57.5 | 91.7 | 92.6 |
|   |   | 2nd | 32 |            | 1.92 × 105 |      |      | 819 | 1377 | 944 | 86.7 | 94.3 | 93.7 |
| 9 | 2 | 1rst | 63 | 6.41 × 105 | 1.64 × 106 | 3.09 | 1.93 | 400 | 1513 | 844 | 57.5 | 91.7 | 92.6 |
|   |   | 2nd | 37 |            | 2.40 × 105 |      |      | 814 | 1465 | 984 | 93.1 | 94.5 | 93.5 |
| 10 | 2 | 1rst | 63 | 6.41 × 105 | 1.64 × 106 | 3.09 | 1.93 | 400 | 1513 | 844 | 57.5 | 91.7 | 92.6 |
|   |   | 2nd | 37 |            | 2.40 × 105 |      |      | 814 | 1377 | 1100 | 97.9 | 96.3 | 95.4 |
| 11 | 3 | 1rst | 63 | 6.41 × 105 | 1.64 × 106 | 3.09 | 1.93 | 400 | 1513 | 844 | 57.5 | 91.7 | 92.6 |
|   |   | 2nd | 19 |            | 1.20 × 105 |      |      | 828 | 1195 | 902 | 76.2 | 93.6 | 93.6 |
|   |   | 3rd | 19 |            | 1.20 × 105 |      |      | 885 | 1255 | 981 | 93.6 | 94.7 | 93.6 |
| 12 | 3 | 1rst | 60 | 6.69 × 105 | 1.64 × 106 | 3.09 | 1.85 | 400 | 1513 | 844 | 57.5 | 91.7 | 92.6 |
|   |   | 2nd | 20 |            | 1.34 × 105 |      |      | 827 | 1230 | 909 | 78.4 | 93.8 | 93.7 |
|   |   | 3rd | 20 |            | 1.34 × 105 |      |      | 889 | 1300 | 1018 | 96.8 | 94.7 | 93.2 |
| 13 | 3 | 1rst | 58 | 6.97 × 105 | 1.64 × 106 | 3.09 | 1.78 | 400 | 1513 | 844 | 57.5 | 91.7 | 92.6 |
|   |   | 2nd | 21 |            | 1.48 × 105 |      |      | 825 | 1260 | 915 | 80.2 | 93.9 | 93.7 |
|   |   | 3rd | 21 |            | 1.48 × 105 |      |      | 894 | 1344 | 1075 | 98.8 | 94.7 | 92.2 |
| 14 | 3 | 1rst | 57 | 6.98 × 105 | 1.64 × 106 | 3.09 | 1.78 | 400 | 1513 | 844 | 57.5 | 91.7 | 92.6 |
|   |   | 2nd | 28 |            | 1.98 × 105 |      |      | 819 | 1369 | 947 | 87.4 | 94.3 | 93.7 |
|   |   | 3rd | 14 |            | 0.99 × 105 |      |      | 933 | 1249 | 1076 | 98.9 | 94.7 | 92.2 |
| 15 | 3 | 1rst | 44 | 6.88 × 105 | 1.54 × 106 | 4.07 | 1.80 | 400 | 1513 | 844 | 41.9 | 90.9 | 92.4 |
|   |   | 2nd | 28 |            | 1.92 × 105 |      |      | 773 | 1369 | 947 | 71.6 | 94.5 | 94.4 |
|   |   | 3rd | 28 |            | 1.92 × 105 |      |      | 865 | 1249 | 1076 | 97.8 | 95.6 | 93.5 |
| 16 | 5 | 1rst | 20 | 6.89 × 105 | 1.37 × 106 | 9.00 | 1.80 | 400 | 1050 | 739 | 19.8 | 93.8 | 96.2 |
|   |   | 2nd | 20 |            | 1.38 × 105 |      |      |     | 1172 | 824 | 40.7 | 95.1 | 96.7 |
|   |   | 3rd | 20 |            | 1.38 × 105 |      |      |     | 1228 | 888 | 62.0 | 96.3 | 97.1 |
|   |   | 4th | 20 |            | 1.38 × 105 |      |      |     | 1302 | 952 | 83.5 | 96.8 | 97.2 |
|   |   | 5th | 20 |            | 1.38 × 105 |      |      |     | 1379 | 1117 | 99.3 | 96.7 | 95.0 |

In this multiple oxygen injection design, the gas peak temperature in each catalyst bed section can be controlled by the amount of $O_2$ supplied to that section, and the exit temperature from each stage can be gradually raised to a desired final level, without supplying additional heat to the system, and it can achieve both high conversion and selectivities.

Figure 8:
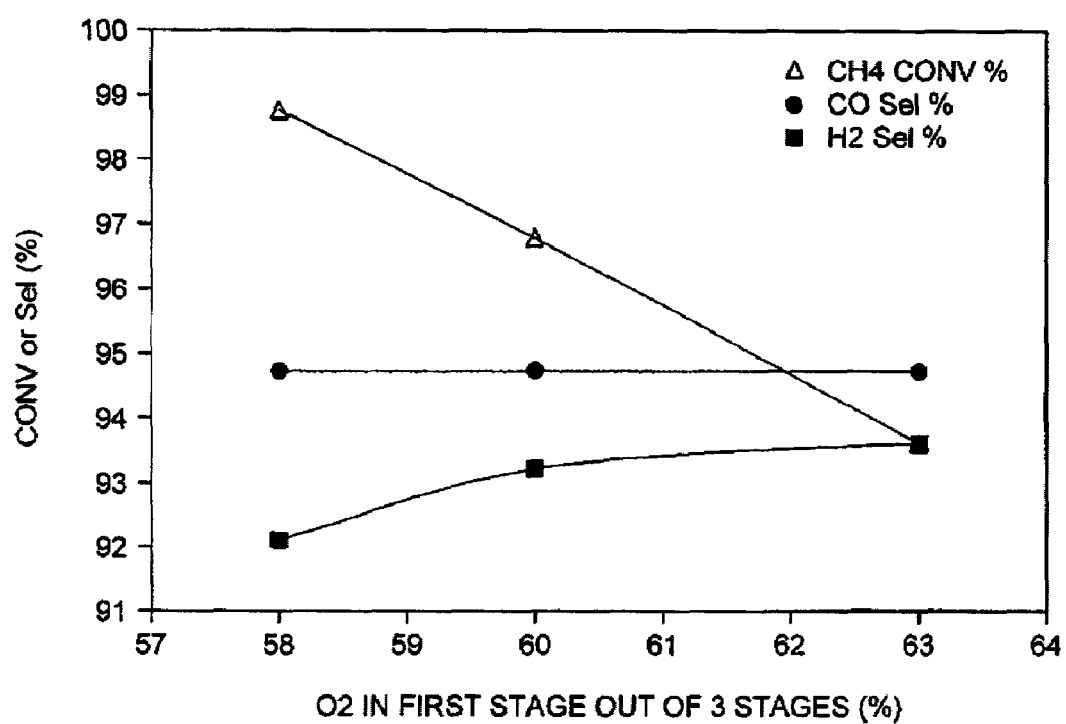
FIG. 8 is a graph showing the influence of the fraction of oxygen used in the first injection with respect to the overall catalytic performance.

For a three-injection scheme, FIG. 8 shows the influence of the fraction of oxygen (% oxygen) which is used in the first injection with respect to overall catalytic performance (methane conversion, product selectivity). The data is extracted from Examples 11-13 with the same C:$O_2$ molar ratio of 3.09:1. The two subsequent $O_2$ injections have an equal amount of oxygen, which represents half of the oxygen balance. As the percentage of $O_2$ in the first injection is increased from 58 to 63%, the hydrocarbon conversion inversely decreases from 98.8% to 93.6%, thereby supporting that there should be a careful selection of the fraction of oxygen which is delivered to the first stage. The CO selectivity appears somewhat unaffected, whereas the $H_2$ selectivity is slightly improved.

The embodiments and the examples set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A process for the production of synthesis gas comprising steps:
   providing a reactor system comprising:
   a multitude of catalytic partial oxidation zones connected in series;
   a plurality of oxidant gas inlets, each of oxidant gas inlet being suitable to deliver an amount of an oxygen-containing gas to at least one catalytic partial oxidation zone; and
   one hydrocarbon gas inlet located upstream of said multitude of catalytic partial oxidation zones, said hydrocarbon gas inlet being suitable to deliver an amount of a hydrocarbon gas to one catalytic partial oxidation zone;
   feeding a hydrocarbon gas through said hydrocarbon gas inlet to one catalytic partial oxidation zone, wherein the hydrocarbon gas has a hydrocarbon gas inlet temperature less than 400° C.;
   feeding an oxygen-containing gas through said plurality of oxidant gas inlets to the multitude of catalytic partial oxidation zones; and
   converting the hydrocarbon gas and oxygen in the multitude of catalytic partial oxidation zones to form a multitude of gas effluents comprising hydrogen and carbon monoxide;
   wherein at least one gas effluent gas has a gas temperature which is at least 550° C. greater than the hydrocarbon gas inlet temperature;
   wherein each gas effluent has a gas temperature less than 1300° C.;
   wherein unconverted hydrocarbon gas from one gas effluent of one catalytic partial oxidation zone is fed to the catalytic partial oxidation zone immediate downstream of said catalytic partial oxidation zone; and further wherein the gas effluent temperature of at least one catalytic partial oxidation zone is controlled by a method comprising these steps:
a. measuring the gas effluent temperature of the at least one catalytic partial oxidation zone;
b. comparing the measured gas effluent temperature to a desirable gas effluent temperature setpoint equal to or lower than 1300° C.;
c. adjusting the $O_2$ mass flow rate of the oxygen-containing gas fed to said at least one catalytic partial oxidation zone, such as to deliver an amount of oxygen to said at least one catalytic partial oxidation zone suitable to obtain a gas effluent temperature that approaches the desirable gas effluent temperature setpoint.

2. The process of claim 1 wherein the hydrocarbon gas and the oxygen-containing gas are fed in such as manner so as to obtain a molar ratio of oxygen-to-carbon lower than 0.5.

3. The process of claim 2 wherein the hydrocarbon gas and the oxygen-containing gas are fed in such as manner so as to obtain a molar ratio of oxygen-to-carbon lower than 0.4.

4. The process of claim 1 wherein the hydrocarbon gas and the oxygen-containing gas are fed in such as manner so as to obtain a molar ratio of oxygen-to-carbon greater than 0.1.

5. The process of claim 1 wherein the hydrocarbon gas when in contact with the oxygen-containing gas has a molar ratio of oxygen-to-carbon corresponding to a pre-ignition point, and the hydrocarbon gas and the oxygen-containing gas are fed in such as manner so as to obtain a molar ratio of oxygen-to-carbon less than said pre-ignition point.

6. The process of claim 1 wherein the multitude of catalytic partial oxidation zones comprises different catalyst compositions.

7. The process of claim 6 wherein the multitude of catalytic partial oxidation zones comprises one catalyst with the same composition.

8. The process of claim 6 wherein the multitude of catalytic partial oxidation zones comprises at least one catalyst comprising at least one metal from Groups 8, 9, and 10 of the Periodic Table.

9. The process of claim 8 wherein the catalyst comprises rhodium, iridium, ruthenium or combinations thereof.

10. The process of claim 8 wherein the catalyst comprises rhodium.

11. The process of claim 10 wherein the catalyst further comprises a rare-earth metal or rare-earth metal oxide.

12. The process of claim 11 wherein the rare-earth metal comprises samarium, ytterbium, praseodymium, neodymium, lanthanum, or any combination of two or more thereof.

13. The process of claim 1 wherein the reactor system further comprises an interbed region between one catalytic partial oxidation zone and the catalytic partial oxidation zone immediately upstream.

14. The process of claim 13 wherein the reactor system further comprises a gas distribution system located in said interbed region and wherein the distribution is suitable for distributing an amount of the oxygen-containing gas.

15. The process of claim 14 wherein the gas distribution system is further suitable for distributing the effluent gas from the catalytic partial oxidation zone immediately upstream.

16. The process of claim 13 wherein the distribution system comprises at least one nozzle, at least one sparger, or combinations.

17. The process of claim 13 wherein the distribution system comprises a plurality of nozzles.

18. The process of claim 1 wherein each gas effluent has a gas temperature less than 1100° C.

19. The process of claim 1 wherein the hydrocarbon gas comprises methane.

20. The process of claim 1 wherein the hydrocarbon gas comprises natural gas.

21. The process of claim 1 wherein the multitude of catalytic partial oxidation zones comprises one upstream catalytic partial oxidation zone and one downstream catalytic partial oxidation zone, and wherein the downstream catalytic partial oxidation zone has a greater volume than said upstream catalytic partial oxidation zone.

22. The process of claim 1 wherein the multitude of catalytic partial oxidation zones are enclosed by at least one porous or perforated wall.

23. The process of claim 22 wherein the porous or perforated wall includes a catalyst comprising at least one metal from Groups 8, 9, and 10 of the Periodic Table.

24. The process of claim 22 wherein the porous or perforated wall comprises orifices, and wherein the multitude of oxidant inlets comprises said orifices.

25. The process of claim 24 wherein feeding the oxygen-containing gas through the porous or perforated wall orifices comprises applying a pressure differential between the catalytic partial oxidation zones and the oxidant inlets.

26. The process of claim 1 wherein the effluent gas from at least one of the multitude of catalytic partial oxidation zone has an $O_2$ content equal to or less than 1,000 ppm.

27. The process of claim 1 wherein the effluent gas from the multitude of catalytic partial oxidation zone has an $O_2$ content equal to or less than 1,000 ppm.

28. The process of claim 1 wherein the multitude of catalytic partial oxidation zones connected in series includes a most upstream catalytic partial oxidation zone, and the gas effluent temperature of said most upstream catalytic partial oxidation zone is controlled by the method comprising said steps (a),(b) and (c).

29. The process of claim 1 wherein adjusting the $O_2$ mass flow of the oxygen-containing gas in step (c) is performed by adjusting the flow rate of the oxygen-containing gas fed to the at least one catalytic partial oxidation zone, by adjusting the $O_2$ content of the oxygen-containing gas fed to the at least one catalytic partial oxidation zone, by adjusting the pressure of the oxygen-containing gas fed to the at least one catalytic partial oxidation zone, or any combination thereof.

30. The process of claim 1 wherein the measured gas effluent temperature in step (a) is lower than the desirable gas effluent temperature setpoint, and wherein adjusting the $O_2$ mass flow rate of the oxygen-containing gas fed to the at least one catalytic partial oxidation zone in step (c) comprises increasing the $O_2$ mass flow rate fed to the at least one catalytic partial oxidation zone.

31. The process of claim 1 wherein the measured gas effluent temperature in step (a) is higher than the desirable gas effluent temperature setpoint, and wherein adjusting the $O_2$ mass flow rate of the oxygen-containing gas fed to the at least one catalytic partial oxidation zone in step (c) comprises decreasing the $O_2$ mass flow rate fed to the at least one catalytic partial oxidation zone.

32. An apparatus for the production of synthesis gas comprising
a reactor shell;
an upper plenum within said reactor shell;
a lower plenum within said reactor shell;
an oxygen chamber located inside said reactor shell between the upper plenum and the lower plenum;
a multitude of catalytic partial oxidation zones enclosed within porous or perforated walls, each partial oxidation zone being surrounded by the oxygen chamber, said porous or perforated walls being dividing elements which separate the multitude of catalytic partial oxidation zones and the oxidant chamber and further allowing mass transfer therethrough from the oxidant chamber into each catalytic partial oxidation zone;
one oxidant gas inlet on the reactor shell in fluid communication with the oxygen chamber, said oxidant gas inlet being suitable to feed an oxygen-containing gas to the oxygen chamber;
one hydrocarbon gas inlet on the reactor shell located upstream of the multitude of catalytic partial oxidation zones in the reactor upper plenum, said hydrocarbon gas inlet being suitable to distribute an amount of a hydrocarbon gas to each of the catalytic partial oxidation zones; and
one reactor outlet on the reactor shell located downstream of the multitude of catalytic partial oxidation zones in the reactor lower plenum, said hydrocarbon gas outlet being suitable to pass a product stream which exits the reactor vessel.

33. The apparatus of claim 32 wherein the apparatus comprises a plurality of oxidant gas inlets and a plurality of oxygen chambers, wherein each of said oxidant gas inlets is in fluid communication with one oxygen chamber.

34. The apparatus of claim 32 wherein the porous or perforated walls comprise an inverted-cone porous structure which contains the multitude of catalytic partial oxidation zones.

* * * * *